(12) United States Patent
Hopkins et al.

(10) Patent No.: US 12,466,031 B2
(45) Date of Patent: Nov. 11, 2025

(54) SYSTEMS AND APPARATUS FOR USE OF WET RECYCLED ABRASIVE AND METHODS OF OPERATION OF SAID SYSTEMS AND APPARATUS

(71) Applicant: Flow International Corporation, Kent, WA (US)

(72) Inventors: Jordan J. Hopkins, Kenmore, WA (US); Adrian T. Kirn, Tacoma, WA (US); Blake G. Bozlee, Seatac, WA (US); Ethan E. Romanoff, Bonney Lake, WA (US); Glenn A. Erichsen, Everett, WA (US); Mohamed A. Hashish, Bellevue, WA (US)

(73) Assignee: Flow International Corporation, Kent, WA (US)

( * ) Notice: Subject to any disclaimer, the term of this patent is extended or adjusted under 35 U.S.C. 154(b) by 401 days.

(21) Appl. No.: 17/975,407

(22) Filed: Oct. 27, 2022

(65) Prior Publication Data

US 2024/0139910 A1    May 2, 2024

(51) Int. Cl.
  *B24C 7/00*   (2006.01)
  *B24C 1/04*   (2006.01)
  *B24C 11/00*  (2006.01)

(52) U.S. Cl.
  CPC ............ *B24C 7/0053* (2013.01); *B24C 1/045* (2013.01); *B24C 7/0015* (2013.01);
  (Continued)

(58) Field of Classification Search
  CPC .......... B24C 1/045; B24C 9/00; B24C 9/006; B24C 5/04; B24C 5/02; B24C 7/007;
  (Continued)

(56) References Cited

U.S. PATENT DOCUMENTS 3,984,943 A   10/1976   Kono et al.
4,202,142 A   5/1980    Van
(Continued)

FOREIGN PATENT DOCUMENTS

CN   209868331 U   12/2019
CN   211439598 U   9/2020
(Continued)

OTHER PUBLICATIONS

International Search Report and Written Opinion for PCT/US2022078907, mailed Mar. 7, 2023, 15 pages.
(Continued)

*Primary Examiner* — Robert F Neibaur
(74) *Attorney, Agent, or Firm* — Cozen O'Connor

(57) ABSTRACT

Disclosed herein are components, systems, and methods of operating an abrasive fluid jet system that recycles and reuses abrasive particles. The systems and methods described enable accurate metering and consistent feeding of wet abrasive particles thereby reducing the time and cost of operations associated with drying the recycled abrasive particles prior to reuse. The system may adjust a ratio of wet abrasive to dry abrasive being provided to a cutting head to form an abrasive fluid jet. Components of the system may overcome challenges associated with clumping and other issues that result in difficulty metering wet abrasive.

22 Claims, 8 Drawing Sheets

(52) U.S. Cl.
CPC .......... *B24C 7/0038* (2013.01); *B24C 7/0076* (2013.01); *B24C 11/00* (2013.01)

(58) Field of Classification Search
CPC ... B24C 7/0084; B24C 7/0053; B24C 7/0015; B24C 7/0038; B24C 7/0076; B24C 11/00; B24B 57/00; B24B 57/02
USPC .............. 451/38, 102, 40, 99, 101, 91, 446; 83/177, 53
See application file for complete search history.

(56) References Cited

U.S. PATENT DOCUMENTS

| | | | |
|---|---|---|---|
| 4,669,230 A | 6/1987 | Suzuki et al. | |
| 4,872,293 A | 10/1989 | Yasukawa et al. | |
| 5,035,089 A | 7/1991 | Tillman et al. | |
| 5,468,174 A | 11/1995 | Bachand et al. | |
| 5,545,074 A | 8/1996 | Jacobs | |
| 5,562,531 A | 10/1996 | Yamaharu | |
| 5,643,058 A | 7/1997 | Erichsen et al. | |
| 5,827,114 A | 10/1998 | Yam et al. | |
| 6,224,463 B1 | 5/2001 | Hartzell | |
| 6,299,510 B1 | 10/2001 | Massenburg | |
| 6,328,638 B1 | 12/2001 | Hopkins et al. | |
| 6,361,416 B1 | 3/2002 | Hopkins et al. | |
| 6,766,216 B2 | 7/2004 | Erichsen et al. | |
| 6,805,618 B1 | 10/2004 | Ward et al. | |
| 6,875,084 B2 | 4/2005 | Hashish et al. | |
| 7,147,545 B2 | 12/2006 | Gadd | |
| 8,277,277 B2 | 10/2012 | Mase et al. | |
| 8,308,525 B2 | 11/2012 | Hashish et al. | |
| 8,764,513 B1 | 7/2014 | Spears | |
| 9,011,204 B2 | 4/2015 | Raghavan et al. | |
| 9,440,370 B2 | 9/2016 | Hayden | |
| 9,579,773 B2 | 2/2017 | Adams | |
| 10,478,944 B2 | 11/2019 | Mestanek et al. | |
| 11,224,987 B1 | 1/2022 | Guglielmetti | |
| 11,577,366 B2 | 2/2023 | Schubert et al. | |
| 11,872,670 B2 | 1/2024 | Schubert et al. | |
| 2003/0037650 A1 | 2/2003 | Knaupp et al. | |
| 2007/0037495 A1 | 2/2007 | Matsubara et al. | |
| 2010/0124872 A1* | 5/2010 | Hashish | B24C 5/02 451/75 |
| 2018/0161958 A1 | 6/2018 | Schubert et al. | |
| 2019/0084125 A1 | 3/2019 | Nambiath et al. | |
| 2019/0210188 A1 | 7/2019 | Pastori | |
| 2021/0154799 A1 | 5/2021 | Dean et al. | |

FOREIGN PATENT DOCUMENTS

| | | | |
|---|---|---|---|
| CN | 111906696 B | 12/2021 | |
| EP | 0119338 A1 * | 9/1984 | .............. B24C 5/04 |
| JP | H05177546 A | 7/1993 | |
| JP | H07124865 A | 5/1995 | |
| WO | 9817439 A2 | 4/1998 | |
| WO | 2020237804 A1 | 12/2020 | |

OTHER PUBLICATIONS

International Search Report and Written Opinion for PCT/US2023/077601 mailed Mar. 14, 2024, 19 pages.

* cited by examiner

SYSTEMS AND APPARATUS FOR USE OF WET RECYCLED ABRASIVE AND METHODS OF OPERATION OF SAID SYSTEMS AND APPARATUS

BACKGROUND

Technical Field

This disclosure relates to fluid jet systems and related methods, and more particularly, to the use of abrasive fluid jet systems that process workpieces and that recycle wet abrasive for repeat use.

Description of the Related Art

Waterjet or abrasive waterjet cutting systems are used for cutting a wide variety of materials, including stone, glass, ceramics, and metals. In a typical waterjet cutting system, high-pressure water flows through a cutting head having a nozzle which directs a cutting jet onto a workpiece. The system may draw or feed abrasive media into the high-pressure waterjet to form a high-pressure abrasive waterjet. One or both of the cutting head and the workpiece may then be controllably moved relative to the other of the cutting head and the workpiece to cut the workpiece as desired. Systems for generating high-pressure waterjets are currently available, such as, for example, the Mach 500 multi-axis waterjet cutting system manufactured by Shape Technologies Group. Other examples of waterjet cutting systems are shown and described in Flow's U.S. Pat. No. 5,643,058, which is incorporated herein by reference in its entirety.

FIG. 1 shows an example embodiment of a waterjet cutting system 10. The waterjet cutting system 10 may include a catcher tank 11 having a work support surface 13 (e.g., an arrangement of slats) that is configured to support a workpiece 14 to be processed by the system 10. The waterjet cutting system 10 may further include a bridge assembly 15, which is movable along a pair of base rails 16 and straddles the catcher tank 11. In operation, the bridge assembly 15 can move back and forth along the base rails 16 with respect to a translational axis Y to position a cutting head 12 of the system 10 to process the workpiece 14.

A tool carriage 17 may be movably coupled to the bridge assembly 15 to translate back and forth along another translational axis X, which is aligned perpendicularly to the aforementioned translational axis Y. The tool carriage 17 may be configured to raise and lower the cutting head 12 along yet another translational axis Z to move the cutting head 12 toward and away from the workpiece 14. One or more manipulable links or members may also be provided intermediate the cutting head 12 and the tool carriage 17 to provide additional functionality.

As an example, the waterjet cutting system 10 may include a forearm 18 rotatably coupled to the tool carriage 17 so as to rotate the cutting head 12 about an axis of rotation, and a wrist 19 rotatably coupled to the forearm 18 to rotate the cutting head 12 about another axis of rotation that is non-parallel to the aforementioned rotational axis. In combination, the rotational axes of the forearm 18 and wrist 19 can enable the cutting head 12 to be manipulated in a wide range of orientations relative to the workpiece 14 to facilitate, for example, cutting of complex profiles. The rotational axes may converge at a focal point which, in some embodiments, may be offset from the end or tip of a nozzle component of the cutting head 12.

During operation, movement of the cutting head 12 with respect to each of the translational axes and one or more rotational axes may be accomplished by various conventional drive components and an appropriate control system 20. The control system may generally include, without limitation, one or more computing devices, such as processors, microprocessors, digital signal processors (DSP), application-specific integrated circuits (ASIC), and the like. To store information, the control system may also include one or more storage devices, such as volatile memory, non-volatile memory, read-only memory (ROM), random access memory (RAM), and the like.

The storage devices can be coupled to the computing devices by one or more buses. The control system may further include one or more input devices (e.g., displays, keyboards, touchpads, controller modules, or any other peripheral devices for user input) and output devices (e.g., display screens, light indicators, and the like). The control system can store one or more programs for processing any number of different workpieces according to various cutting head movement instructions. The control system may also control operation of other components, such as, for example, a secondary fluid source, a vacuum device and/or a pressurized gas source coupled to the waterjet cutting head assemblies and components described herein.

The control system, according to one embodiment, may be provided in the form of a general-purpose computer system. The computer system may include components such as a CPU, various I/O components, storage, and memory. The I/O components may include a display, a network connection, a computer-readable media drive, and other I/O devices (a keyboard, a mouse, speakers, etc.). A control system manager program may be executing in memory, such as under control of the CPU, and may include functionality related to, among other things, routing pressurized water through the waterjet cutting systems described herein, providing a flow of secondary fluid to adjust or modify the coherence of a discharged fluid jet and/or providing a pressurized gas stream to provide for unobstructed waterjet cutting of a workpiece.

Further example control methods and systems for waterjet cutting systems, which include, for example, CNC functionality, and which are applicable to the fluid jet cutting systems described herein, are described in U.S. Pat. No. 6,766,216. In general, computer-aided manufacturing (CAM) processes may be used to efficiently drive or control a cutting head along a designated path, such as by enabling two-dimensional or three-dimensional models of workpieces generated using computer-aided design (i.e., CAD models) to be used to generate code to drive the machines. For example, in some instances, a CAD model may be used to generate instructions to drive the appropriate controls and motors of a fluid jet cutting system to manipulate the cutting head about various translational and/or rotational axes to cut or process a workpiece as reflected in the CAD model.

Details of the control system, conventional drive components and other well-known systems associated with fluid jet cutting systems, however, are not shown or described in detail to avoid unnecessarily obscuring descriptions of the embodiments. Other known systems associated with fluid jet cutting systems include, for example, a pressurized fluid source (e.g., direct drive and intensifier pumps with pressure ratings of at least 60,000 psi, at least 90,000 psi, or at least 110,000 psi) for supplying pressurized fluid to the cutting head.

According to some embodiments, the waterjet cutting system 10 includes a pump, such as, for example, a direct drive pump or intensifier pump, to selectively provide a source of pressurized water at an operating pressure of at least 30,000 psi, at least 55,000 psi, at least 90,000 psi, or at least 110,000 psi. The cutting head 12 of the waterjet cutting system 10 may receive the high pressure water supplied by the pump and generate a high pressure waterjet for processing workpieces. A fluid distribution system in fluid communication with the pump and the cutting head 12 may be provided to assist in routing pressurized water from the pump to the cutting head 12.

Abrasive waterjet cutting systems are advantageously used when cutting workpieces made of particularly hard materials to meet exacting standards. In the current industry-standard abrasive waterjet cutting process, abrasive is introduced into a high-velocity water stream (i.e., a water jet). The dry abrasive combines with the water stream in a mixing area and is accelerated as it flows down a mixing tube. Portions of the abrasive fracture during the mixing process and fracture further as the abrasive abrades and cuts the target material/workpiece. After cutting, the velocity of the abrasive is arrested as it is injected into a water tank (e.g., positioned opposite the cutting head with respect to the workpiece. As the abrasive slows down, the result is wet abrasive with a much finer size distribution than the original dry abrasive product. In most cases, the size of the smallest wet abrasive particles makes them no longer suitable for use in an abrasive waterjet cutting system.

Abrasive waterjet cutting heads may consume significant quantities of abrasive. For example an abrasive waterjet cutting head may consume on the order of 0.5 to 1.5 pounds per minute of abrasive particles. The use of abrasive increases the cost of processing a workpiece with a waterjet cutting system. Consumption of abrasive may account for close to 50 percent of the total running cost of a given abrasive waterjet cutting system. Thus, attempts have been made to develop systems and methods that reduce the amount of abrasive consumed while processing a workpiece.

Traditional abrasive recycling systems first remove the accumulated spent abrasive from the catcher tank system. Removal may be a manual or automated process. The automated process typically involves pumps that suck the abrasive and water, now in the form of a slurry, out of the catcher tank and deposits the slurry into another receptacle. The slurry may also contain pieces of the material being cut, with the larger pieces often removed by a screening process. After the abrasive slurry is removed from the catcher tank, many users simply discard it. Any possible gains from recycling are lost with this method. Additionally, there may be added costs for haul-away and waste management.

Traditional abrasive recycling systems sort the spent abrasive by size. The finest particles (e.g., those that are too small to be suitable for mixing with a fluid jet to form an abrasive fluid jet and cut a workpiece) are removed and discarded. Sorting may be done by physical filtering with screens and/or filter papers, or by techniques using water flow to separate the abrasive sizes. Abrasive particles larger than a target size are kept, while those particles smaller than the target size are discarded. In some cases, an additional wash process may be required to remove ultra-fine particles, or dust, from the recovered abrasive. Too much dust in the dried abrasive can hinder smooth flow and may reduce the cutting power of the abrasive waterjet.

According to known methods, before the recovered abrasive may be used in the formation of an abrasive waterjet, it is dried. Known systems include a heater positioned to dry the wet abrasive particles, but other techniques are used (e.g., the abrasive may be spread out and dried in the sun, if the system is present in an appropriate climate). After drying, the recycled abrasive is reintroduced into the abrasive supply chain for reuse.

One method of reducing the consumption of abrasive is to recycle abrasive after they are used to process a workpiece a first time and use the recycled abrasive to process the workpiece an additional time. Known approaches for removing abrasive from a catcher tank and recycling abrasive are described in U.S. Pat. Nos. 6,299,510, 6,328,638, and 6,361,416, which are incorporated herein by reference in their entireties.

However, these known methods are limited in their ability to reduce consumption and cost of abrasive due to the processing used to ready the spent/recycled abrasive for reintroduction into the cutting head to be mixed once again with a fluid jet. Thus, a need exists for systems and methods that reduce the cost and processing needed to recycle abrasive.

BRIEF SUMMARY

Abrasive fluid jet and waterjet (referred to collectively herein as AWJ) cutting systems typically employ significant efforts to keep the abrasive dry before mixing with the fluid jet/waterjet to form an AWJ. One motivation for keeping the abrasive dry relates to the way abrasive, such as garnet, flow as a function of water content. Controlled flow is important for accurate metering of abrasive flow rates.

When employing AWJ cutting, accurately metering the flow of abrasive into the cutting head is important. Many AWJ systems use a simple gravity feed system for metering purposes. In such a system, abrasive is held in a vessel with a circular orifice located at the bottom of the vessel. The abrasive flow through the orifice is nearly constant and depends on factors such as the orifice diameter, abrasive grain size, abrasive grain structure, and so forth. If the moisture content in the abrasive supply is low, abrasive metering is typically accurate and reliable.

However, if any moisture intrudes into the abrasive supply, problems arise. Even one drop of water can cause a "clump" of abrasive to form. This clump may clog the abrasive metering orifice, the tubing that runs from the metering valve to the cutting head, and/or the cutting head itself. If more abrasive gets wet, the various components of the abrasive transfer system may clog and cease to function.

A small or moderate amount of water in a typical AWJ abrasive system will cause abrasive particles to bond tightly to each other. This will stop the abrasive flow and keep the system from working properly. Additionally, the clumped abrasive may be difficult to steadily/reliably meter. The addition of a consistent amount of abrasive to a fluid jet is an important factor in achieving a consistent and reliable cutting power by the produced AWJ. A lack of consistency in cutting power may result in a finished product with undesirable characteristics (e.g., edge quality). However, by adding a greater amount of water, the abrasive may be transitioned to a phase in which the water and abrasive mixture begins flowing out of the orifice by gravity only. Under certain conditions, the flow of water and abrasive slurry behaves predictably, (e.g., similar to a flow of dry abrasive).

Although adding more water can cause abrasive to flow more reliably, this may not be an acceptable solution for AWJ cutting applications because the additional water will also be mixed with and accelerated along with the abrasive particles. Thus, the addition of more water into the cutting head that mixes with and is accelerated by the fluid jet/ waterjet may ultimately decrease the cutting power of the AWJ, as there is less energy available to accelerate the abrasive particles.

In summary, the use of wet abrasive presents two competing challenges. The first is that too little moisture content within the abrasive results in clumping, which stops the steady flow of abrasive throughout the abrasive supply system, resulting in clogs and/or inaccurate metering. The second is that too much moisture content within the abrasive adversely affects the cutting power of the AWJ.

Thus, it is important for an abrasive recycling system utilizing wet abrasive to carefully consider the components and methods it utilizes to feed and meter the abrasive.

According to one embodiment, a fluid jet cutting system includes a first abrasive feed container and a second abrasive feed container. The first abrasive feed container includes a first vessel that encloses a first interior volume, the first interior volume at least partially occupied by dry abrasive with a first moisture content, and the second abrasive feed container includes a second vessel that encloses a second interior volume, the second interior volume at least partially occupied by wet abrasive with a second moisture content that is higher than the first moisture content.

The system further includes a cutting head having an orifice unit through which fluid passes to generate a fluid jet, a mixing chamber downstream of the orifice unit through which the fluid jet passes, the mixing chamber communicatively coupled to the first abrasive feed container such that the dry abrasive has a first path from the first abrasive feed container to the mixing chamber where the dry abrasive is added to the fluid jet to form an abrasive fluid jet, and the mixing chamber communicatively coupled to the second abrasive feed container such that the wet abrasive has a second path from the second abrasive feed container to the mixing chamber where the wet abrasive is added to the fluid jet to form the abrasive fluid jet, and an outlet though which the abrasive fluid jet exits the cutting head. The system further includes a meter that measures a flow rate of the wet abrasive, and the meter is positioned downstream of the second interior volume and upstream of the mixing chamber with respect to the second path.

Additional embodiments described herein provide a method of operating an abrasive fluid jet cutting system. The method includes feeding dry abrasive from a first abrasive feed container into a mixing chamber of an abrasive fluid jet cutting head, wherein the dry abrasive has a first moisture content when in the first abrasive feed container. The method further includes feeding wet abrasive from a second abrasive feed container into the mixing chamber, wherein the wet abrasive has a second moisture content when in the second abrasive feed container, and the second moisture content is greater than the first moisture content. The method further includes generating a fluid jet within the abrasive fluid jet cutting head such that the fluid jet passes through the mixing chamber, entraining both the dry abrasive and the wet abrasive that has been fed into the mixing chamber into the fluid jet thereby forming an abrasive fluid jet, and metering a flow rate of the wet abrasive at a location upstream of the mixing chamber.

Additional embodiments described herein provide a metering device that includes a vessel that at least partially encloses an interior volume, wherein the interior volume includes a first portion having a first cross-sectional dimension, and the interior volume includes a second portion having a second cross-sectional dimension, the second cross-sectional dimension being smaller than the first cross-sectional dimension. The metering device includes an abrasive inlet that provides passage through the vessel into the first portion of the interior volume, and an abrasive outlet that provides passage through the vessel out of the second portion of the interior volume.

The metering device further includes a shaft that is rotatable relative to the vessel about an axis, wherein the first cross-sectional dimension and the second-cross-sectional dimension are measured along a direction that is perpendicular to the axis, an auger supported by the shaft such that a first portion of the auger is positioned within the first portion of the interior volume and a second portion of the auger is positioned within the second portion of the interior volume, and at least one mixer, the at least one mixer including: one or more stirring rods supported within the first portion of the interior volume such that the one or more stirring rods are movable within the first portion of the interior volume relative to the vessel; one or more rods positioned at least partially within the first portion of the interior volume that vibrate relative to the vessel; one or more air jets positioned so as to supply a stream of air into the first portion of the interior volume of the vessel; or any combination thereof.

Additional embodiments described herein provide a method of metering wet abrasive. The method includes inserting the wet abrasive into a first portion of an interior volume of a vessel, the first portion having a first cross-sectional dimension measured in a first direction, and moving at least one stirring rod within the first portion relative to the vessel thereby imparting movement to at least a portion of the wet abrasive positioned within the first portion. The method further includes rotating an auger about an axis that is parallel to a second direction, thereby transporting portions of the wet abrasive from the first portion of the interior volume to a second portion of the interior volume, wherein the second portion has a second cross-sectional dimension measured in the first direction, and the second cross-sectional dimension is less than the first cross-sectional dimension. The method further includes releasing the transported portion of the wet abrasive from the auger within the second portion of the interior volume, and passing the released wet abrasive through an abrasive outlet that provides egress from the vessel.

Additional embodiments described herein provide a wet abrasive feed hopper that includes a vessel that at least partially encloses an interior volume, the interior volume having a length that extends from a top of the interior volume to a bottom of the interior volume, an abrasive inlet that provides passage through the vessel into the interior volume, the abrasive inlet positioned closer to the top of the interior volume than the abrasive inlet is from the bottom of the interior volume, and an abrasive outlet that provides passage through the vessel out of the interior volume, the abrasive outlet positioned closer to the bottom of the interior volume than the abrasive inlet is from the top of the interior volume. The wet abrasive feed hopper further includes an air inlet that provides passage through the vessel into the interior volume, the air inlet positioned closer to the top of the interior volume than the air inlet is from the bottom of the interior volume; and a meter positioned within the abrasive outlet that measures a flow rate of wet abrasive through the abrasive outlet.

Additional embodiments described herein provide a method of metering wet abrasive. The method includes feeding wet abrasive including abrasive particles and a fluid through an abrasive inlet of a vessel and into an interior volume of the vessel, forming a first layer within the interior volume, the first layer consisting of the abrasive particles and the fluid, wherein all of the interstitial spaces between the abrasive particles are filled with the fluid, and forming a second layer within the interior volume, wherein a majority of the second layer is the fluid, and the second layer is above the first layer. The method further includes pressurizing the interior volume through an inlet that is separate from the abrasive inlet and provides passage through the vessel and into the interior volume, and measuring a flow rate of the abrasive particles and the fluid that exits the interior volume via an abrasive outlet.

Additional embodiments described herein provide a dewatering device that includes an auger that is rotatable about an axis, and a conduit that at least partially encloses the auger, the size and shape of the auger corresponding to the size and shape of the conduit such that rotation of the auger relative to the conduit advances wet abrasive positioned between adjacent flights of the auger along a length of a lumen of the conduit. The dewatering device further includes an abrasive inlet that provides entry into the lumen, and an abrasive outlet that provides egress out of the lumen, the abrasive outlet spaced from the abrasive inlet along the length of the lumen. The dewatering device further includes at least one port fluidly coupled to the lumen at a location between the abrasive inlet and the abrasive outlet with respect to the length, and a pressurizer fluidly coupled to the at least one port such that activation of the pressurizer applies suction to the lumen via the at least one port.

Additional embodiments described herein provide a method of dewatering wet abrasive. The method includes feeding wet abrasive into a lumen of a conduit via an abrasive inlet that provides entry into the lumen, and advancing the wet abrasive toward an abrasive outlet that provides egress from the lumen, wherein advancing the wet abrasive includes rotating an auger about an axis relative to the conduit. The method further includes applying suction to the wet abrasive via one or more ports that are fluidly coupled to both a vacuum and the lumen, wherein the applied suction removes water from the wet abrasive through an interface between the lumen and the one or more ports, and lowering a moisture content of the wet abrasive by applying the suction, and then feeding the wet abrasive with the lower moisture content through the abrasive outlet and into a mixing chamber of an abrasive fluid jet cutting head.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
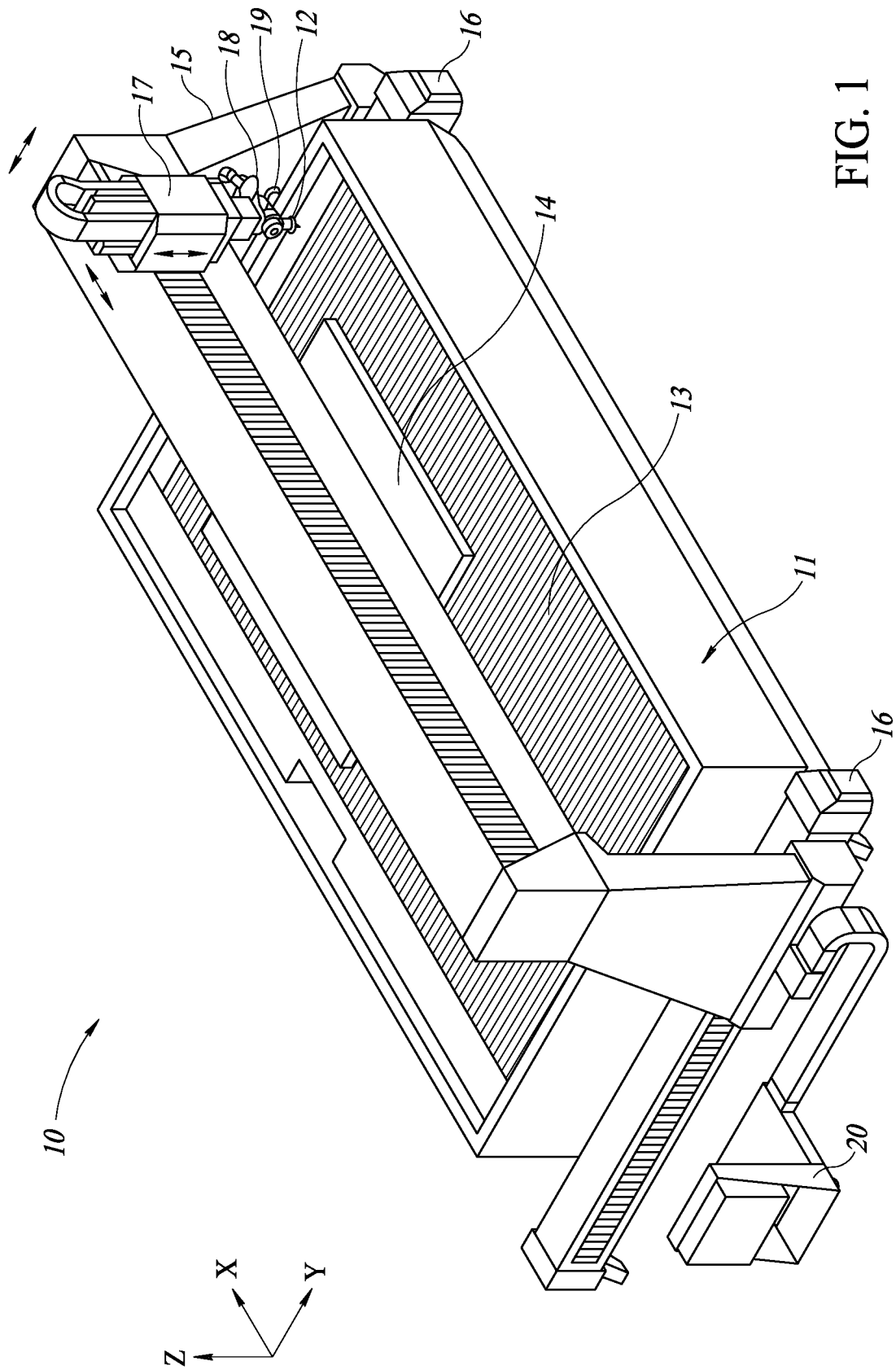
FIG. 1 is an isometric view of a fluid jet system, according to one embodiment.

In the following description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with high pressure waterjet systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. The term "cutting through" a structure refers to a complete removal of material through an entire thickness of the structure along the direction of impact of the cutting apparatus, for example the direction of travel of a waterjet just before it strikes a surface of the workpiece.

The headings and Abstract of the Disclosure provided herein are for convenience only and do not interpret the scope or meaning of the embodiments.

There are two main categories of cutting with high-pressure waterjets and added abrasive. Abrasive Suspension Jets (ASJ) begin with an abrasive-water (slurry) mixture that is pumped through an orifice at high pressure to generate the jet. An Abrasive-Waterjet (AWJ) begins with a high-pressure water stream to which abrasive is added. The term "slurry jet" is often applied to ASJ cutting. In this document, all cutting systems are for an AWJ system unless specified otherwise.

Overcoming the challenges associated with the use of wet abrasive as described above would offer significant benefit to the recycling process. As used herein, "wet" abrasive refers to abrasive with any non-zero amount of water added to (e.g., mixed with) abrasive prior to entrainment by a fluid jet to form an abrasive fluid jet. Use of wet abrasive would simplify the recycling process by eliminating the process associated with drying the abrasive prior to its use. It would also reduce energy consumption and may simplify abrasive transport.

Water laden with abrasive and pumped through tubing is an effective way to move abrasive from one location to another if the water content is high enough compared to the amount of abrasive. Many options exist for pumping abrasive laden liquids/slurries. In some cases, the reduction in cutting power by using wet abrasive in an AWJ cutting system may be acceptable. For example, if there are no surface finish requirements, a "rough" cut (with less clean/smooth edges) may be acceptable, thus enabling cutting speeds available to the wet abrasive. Under these conditions, operating an AWJ with a wet abrasive feed that is in a free-flowing slurry or "soup" phase. Reference to "free-flowing" herein describes a liquid/abrasive mixture that flows or behaves predictably (described in additional detail below). A free-flowing slurry may be desirable since producing one is easily accomplished by increasing water content of a water/abrasive mixture.

Fine abrasive particles (i.e., dust) that are too small to increase the cutting power of an AWJ by their entrainment into a fluid jet may negatively impact performance of an AWJ. When using dry abrasive, high-dust content may affect the gravity flow through an orifice resulting in unreliability in the cutting process performed by the AWJ. Another advantage that results from the use of wet abrasive is a reduction in the negative impact of the fine abrasive particles. When using a wet abrasive feed, the dust has minimal effect on flow and is restricted/prevented from becoming airborne. Additionally, higher water content may affect the striation pattern at the bottom of the cut, which may be beneficial in some applications.

Reliable cutting with an AWJ may include both consistently feeding the abrasive into the cutting head and accurately metering a flow rate of the abrasive into the cutting head. The addition of water into the abrasive supply may affect both the feeding and the metering. For example, as described above, a few drops of water in an abrasive supply tank can hinder/block gravity flow of the abrasive through an orifice. In this example, both feeding and metering are impacted by small amounts of water/moisture in the abrasive supply.

According to one example, moisture in the abrasive supply may not prevent feeding, but may instead impact the abrasive flow rate and attempts to meter that flow rate. When working with a free-flowing abrasive slurry, feeding into the cutting head is relatively easy while metering may become more complex. For example, a pressure vessel filled with water and abrasive may easily move/push the slurry through an orifice and feed line into the cutting head. However, feeding the slurry into the cutting head may be influenced by pressure, hose/tube lengths, orifice sizes, slurry characteristics, and more.

Figure 2:
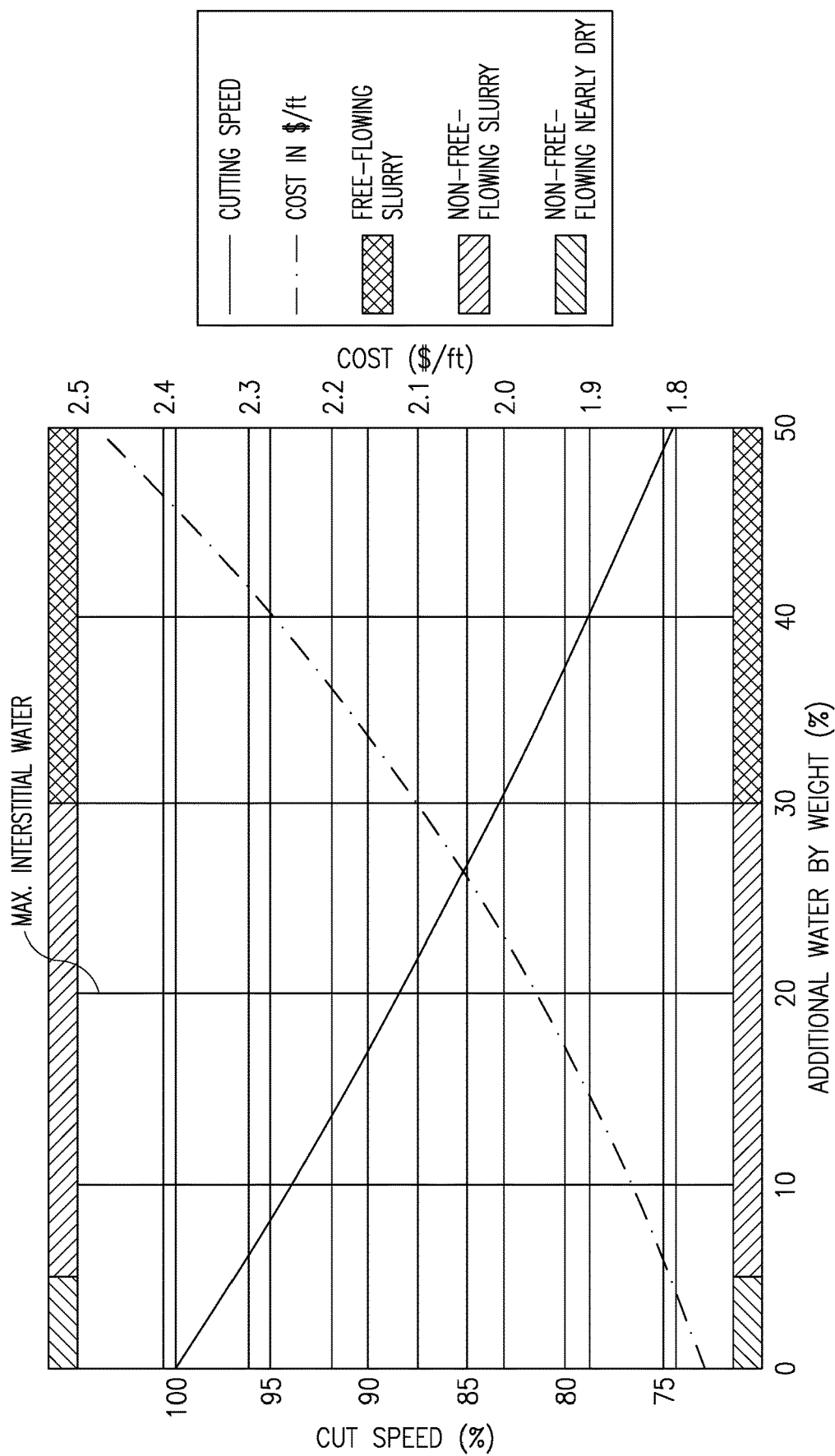
FIG. 2 is a plot illustrating the effect of additional water by weight mixed with abrasive particles on both cut speed and operation cost, according to one embodiment.

Referring to FIG. 2, a theoretical plot illustrates the impact that varying parameters of an AWJ have on the performance of the AWJ. The X-axis of the plot represents the percent by weight of water added to the abrasive flow. For example, if a test is conducted with an abrasive flow rate of 1 pound per minute, 10 percent additional water by weight (on the X-axis) would represent a flow rate of 0.1 pounds per minute of water. The left Y-axis represents the predicted cut speed (shown as a percent), with 100 percent being the fastest reliable cut (i.e., wherein the AWJ pierces an entirety of the thickness of the workpiece 14). The right Y-axis represents the theoretical cost of the cut in dollars per foot. As shown, increasing the amount of water added diminishes the cutting speed and increases the cost per foot.

At 0 percent, or near-zero percent, additional water by weight added to the abrasive flow, the abrasive will flow (e.g., via gravity) easily. Between approximately 0 percent and 5 percent water added to the abrasive may be referred to as "nearly-dry." The nearly dry abrasive may be highly non-flowing but has minimal effect on the cost. The region between 5 percent to 30 percent additional weight of water is a non-free-flowing paste zone. Included in the paste zone may be the point where all interstitial voids of the abrasive are filled with water. The specific maximum interstitial water percentage may vary based on a number of factors (e.g., the specific material of the abrasive). Size and shape of an orifice through which the abrasive mixture flows may influence whether the point where all interstitial voids of the abrasive are filled with water is located within the non-free-flowing paste zone or outside it.

As shown in FIG. 1, all the interstitial voids of the abrasive may be filled with water at about an additional 20 percent water by weight. Above 30 percent additional water by weight, abrasive flow may form a slurry that will freely flow through an orifice under the influence of gravity. However, cutting speed (decreasing) and cost (increasing) become more adversely affected in the free-flowing zone.

It is important to recognize that the percentage of water numbers used here are approximate. Additionally, other parameters may affect the outcome, such as specific abrasive material, grain size, grain shape, material density, surface properties (e.g., hydrophobicity/hydrophilicity), transporting fluid (e.g., pure water), etc. Furthermore, no additives were used in the tests used to generate FIG. 2. Thus, no attempt was made to suspend the abrasive in water. Rather, the abrasive was allowed to settle to the bottom of a water-filled vessel.

Figure 3:
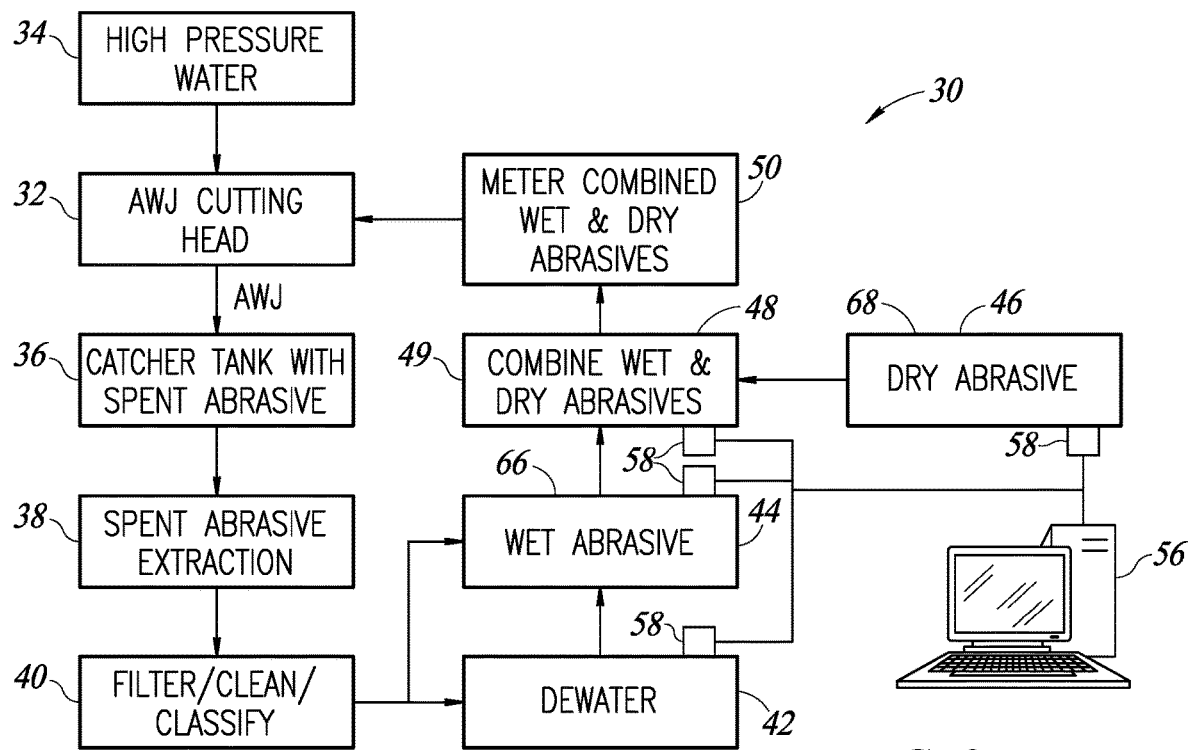
FIG. 3 is a schematic diagram of an abrasive fluid jet system, according to one embodiment.
Figure 4:
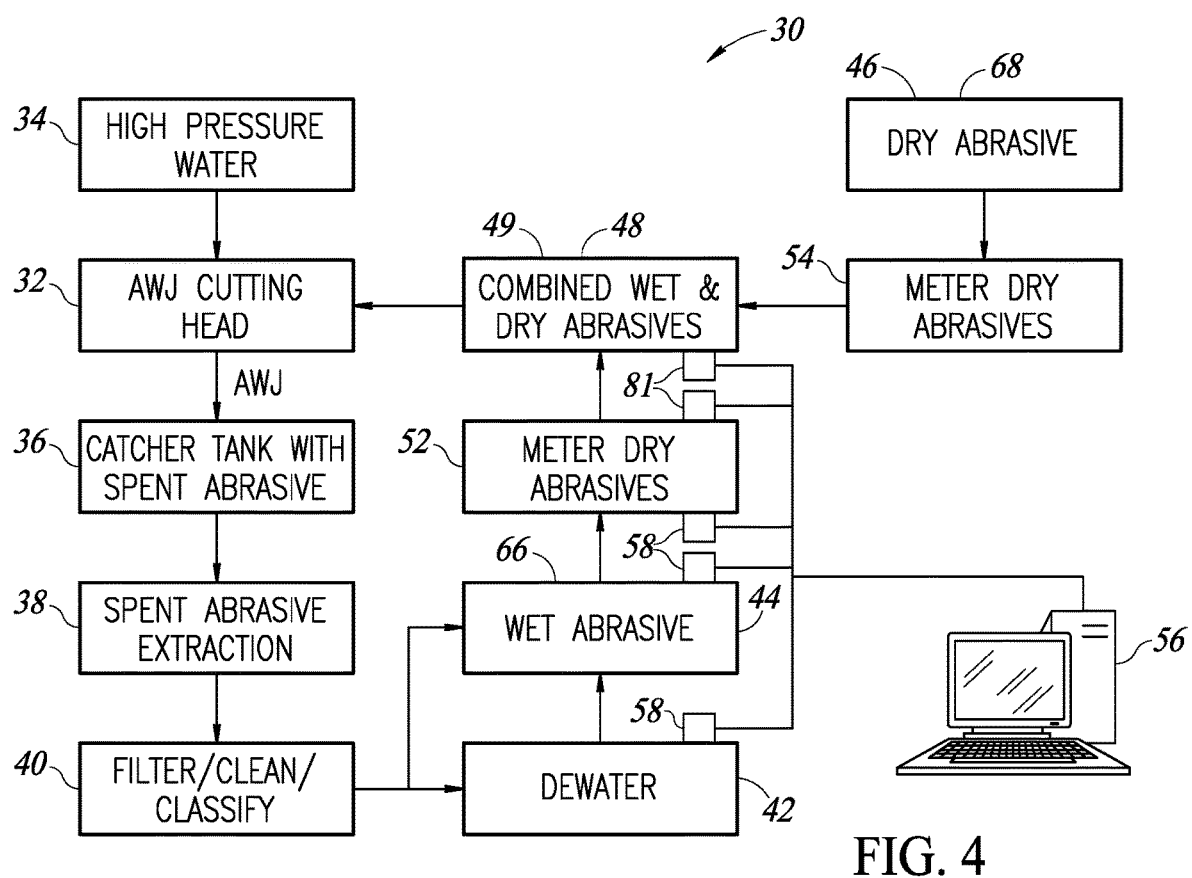
FIG. 4 is a schematic diagram of an abrasive fluid system, according to one embodiment.
Figure 5:
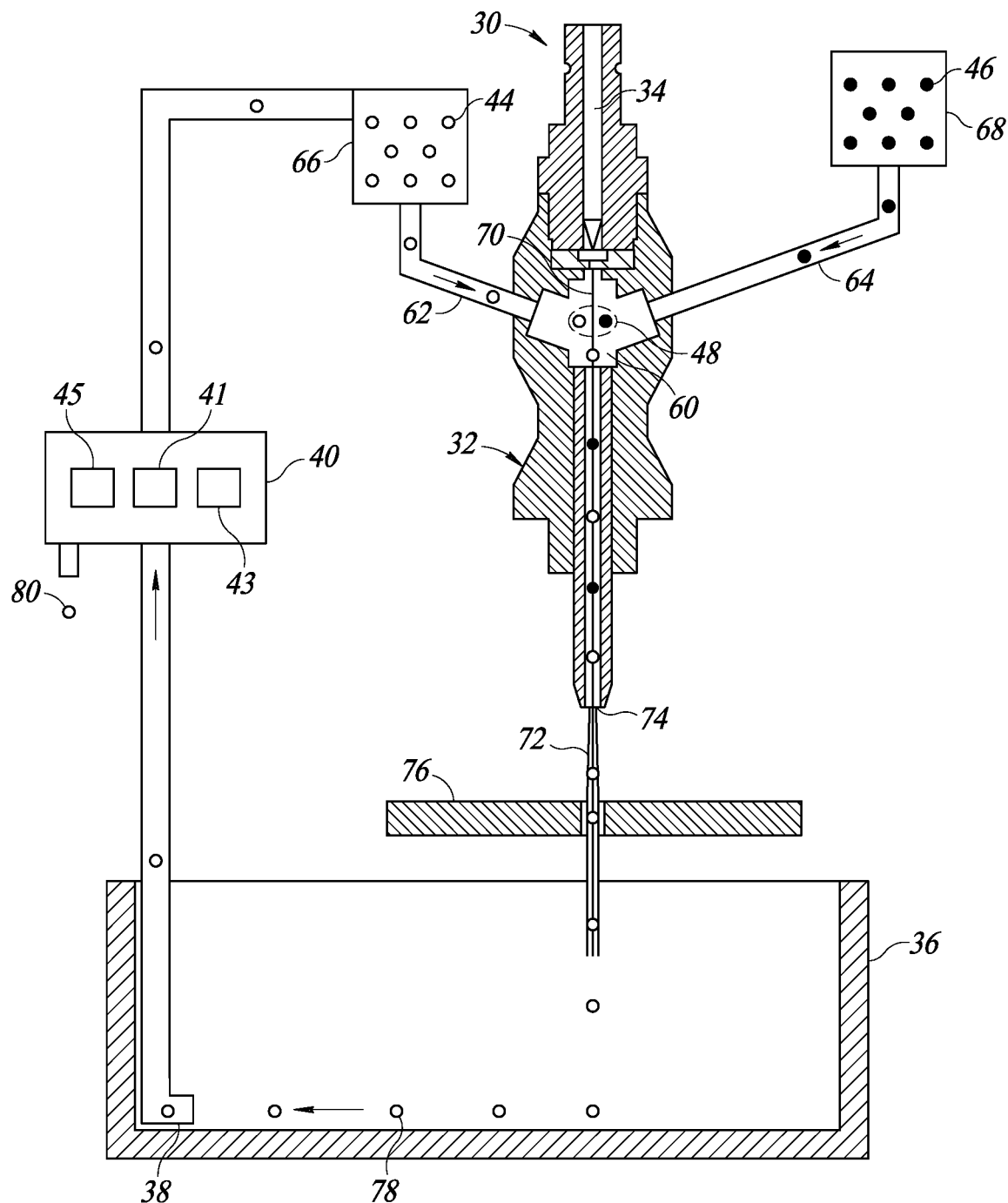
FIG. 5 is a side, cross-sectional view of an abrasive fluid jet system according to one embodiment.

Referring to FIGS. 3 to 5, an AWJ cutting system 30 may be assembled and operated to recycle spent abrasive to be re-used in additional cutting operations beyond the initial cutting operation, in which fresh abrasive (after being mixed with a fluid jet to form an AWJ) processes (e.g., cuts) a workpiece thereby being converted into spent abrasive. The system 30 may use the spent abrasive in a wet condition (e.g., delivering the wet abrasive to an AWJ cutting head 32) to be combined with a fluid jet 70 (e.g., generated from high pressure water 34 supplied to the AWJ cutting head 32).

After processing a workpiece, the AWJ 72, including spent abrasive 78, may enter a catcher tank 36. The catcher tank 36 may include a container (e.g., a tank) that at least partially encloses a volume of fluid (e.g., water). The system 30 may include a spent abrasive extractor 38 that removes spent abrasive from the volume of fluid within the catcher tank 36. According to one embodiment, the removal of the spent abrasive 78 may be manual (e.g., via a person using a scoop or shovel). According to one embodiment, the removal may be automated by the system 30 (e.g., via a conveyor with an inlet positioned within the volume of fluid). The system 30 may include a vacuum source to assist in the removal of the spent abrasive 78 from the volume of fluid, and the transport of the spent abrasive 78 along the conveyor. The catcher tank 36 may include a current within the volume of fluid that flows toward the inlet of the spent abrasive extractor 38.

A method (e.g., a method of recycling wet abrasive, a method of operating an AWJ) may include processing a workpiece 76 with the AWJ 72, dissipating the AWJ 72 in the catcher tank 36, and extracting the spent abrasive 78 from the catcher tank 36.

The system 30 may include a conditioner 40 that separates abrasive particles appropriate for recycling from other particles extracted from the catcher tank 36. The conditioner 40 may include a classifier 41 that classifies the spent abrasive. Classification may include sorting and collecting the portion of the spent abrasive that is suitable for reuse. According to one embodiment, the conditioner 40 may include a sizer 43 (e.g., a sieve) that separates particles of the spent abrasive that are below a certain size from a remainder of the particles of the spent abrasive that are above the certain size. The method may include separating particles of the spent abrasive that are below the certain size from a remainder of the particles of the spent abrasive that are above the certain size.

As the abrasive is used to form the AWJ, a size of a number of the abrasive particles will be reduced, especially when impacting the workpiece while processing the workpiece. Those abrasive particles that are reduced in size will have a reduced cutting power if used in future cycles to once again form the AWJ. The reduction in size for some of the abrasive particles may be so significant as to result in the cutting power of those particles being negligible. The conditioner 40 may be adjustable such that the certain size is selectable to coincide with the material of the abrasive particles and the size at which that material's cutting power is negligible when used in the formation of an AWJ. Those abrasive particles separated by the conditioner 40 that are below the certain size may be removed from the system 30.

For example, the abrasive material may be garnet. The garnet, prior to use in the formation of the AWJ, may have an average size of between about 50 mesh and 220 mesh. Depending upon the processing operation, garnet particles with a size below about 250 mesh may be no longer suitable for use in the formation of the AWJ, and thus the conditioner 40 may be calibrated to remove those particles that are below 250 mesh in size.

The conditioner 40 may include a filter 45 that removes unwanted particles from (i.e., washes or cleans) the extracted spent abrasive 78. According to one aspect, the unwanted particles (e.g., waste 80) may include particles of the workpiece that is being processed by the AWJ.

The system 30 may include a dewaterer 42 that removes excess water from the spent abrasive 78 after they have been extracted from the catcher tank 36. The dewaterer 42 may include a suction system, a cyclonic water separator, or other components that remove and/or separate excess water from the spent abrasive 78. The dewaterer 42 may be positioned at other locations relative to the other components of the system 30 than the relative position shown in the illustrated embodiment (e.g., prior to the conditioner 40, in closer proximity to the AWJ cutting head 32, etc.). The system 30 may also include a heater (not shown) to further remove moisture from the spent abrasive 78 (e.g., downstream of the conditioner 40 and/or the dewaterer 42).

As the system 30 may be operable to incorporate wet abrasive, the dewaterer 42 may be absent from the system 30. Alternatively, the dewaterer 42 may remove a portion of the water from the wet abrasive without removing all of the water from the wet abrasive. Alternatively, the dewaterer 42 may remove all of the water/moisture from the wet abrasive resulting in dry abrasive. According to one embodiment, the dewaterer 42 may reduce the amount of water mixed with the wet abrasive from over an additional 50 percent by weight of water to under an additional 50 percent by weight of water. According to one embodiment, the dewaterer 42 may reduce the amount of water mixed with the wet abrasive from over an additional 50 percent by weight of water to between an additional 30 percent by weight of water and an additional 50 percent by weight of water. According to one embodiment, the dewaterer 42 may reduce the amount of water such that the additional percent by weight of water is proximate to the transition point between the non-free flowing paste phase and the free-flowing slurry phase (e.g., within about 10 percent of the transition point, within about 5 percent of the transition point, within about 2 percent of the transition point, etc.).

The system 30 may include a first path to reintroduce the spent abrasive 78, after extraction and classification, into the AWJ cutting head 32. The first path may include mixing the wet abrasive 44 (after classification and dewatering) with dry (e.g., fresh) abrasive 46 and then at 50 metering the combined wet and dry abrasive 48 prior to feeding the combined wet and dry abrasive 48 into the AWJ cutting head 32, as shown in FIG. 3. The system 30 may include a second path to reintroduce the spent abrasive, after extraction and classification, into the AWJ cutting head 32. The second path may include at 52 metering the wet abrasive 44 (e.g., after classification, dewatering, or both), at 54 separately metering the dry abrasive 46, combining the metered wet abrasive 44 and the metered dry abrasive 46, and feeding the combined wet and dry abrasive 48 into the AWJ cutting head 32, as shown in FIG. 4.

According to one embodiment, the dry abrasive 46 may include fresh abrasive that has not previously been used in the formation of the AWJ, and the wet abrasive 44 may include used abrasive that has been used at least once in the formation of the AWJ. The system 30 may include a feed hopper that accepts a flow of the fresh abrasive and a flow of the used abrasive. The system 30 may blend the fresh abrasive and the used abrasive together within the feed hopper prior to outputting the blended abrasive (e.g., toward the AWJ cutting head 32). The fresh abrasive and the used abrasive may be blended while suspended in liquid (e.g., liquid that forms part of the wet abrasive slurry/paste).

The combined wet and dry abrasive 48 may include any ratio of wet abrasive 44 to dry abrasive 46 (e.g., 100 percent dry abrasive 46 and 0 percent wet abrasive 44, 0 percent dry abrasive 46 and 100 percent wet abrasive 44, and anywhere in between). The ratio may be an adjustable parameter of the system 30. According to one aspect, the system 30 may use all fresh, dry abrasive 46 during start up. As recycled abrasive becomes available, the ratio may be adjusted to include increasing amounts of recycled, wet abrasive 44. The system 30 may include one abrasive feed inlet, as shown in FIGS. 3 and 4. However, the system 30 may include multiple abrasive feed inlets (e.g., one or more inlets for dry abrasive, one or more inlets for wet abrasive, one or more inlets for combined wet and dry abrasive, or any combination thereof), as shown in FIG. 5.

The system 30 may enable a user to adjust the ratio to achieve a desired cutting performance. For example, if a known set of operation parameters of the system 30, including an additional 15 percent of water by weight added to the wet abrasive 44, would result in an acceptable cut performance for the AWJ, and the wet abrasive 44 contains an additional 30 percent by weight of water, the ratio may be adjusted to 50 percent wet abrasive 44 and 50 percent dry abrasive 46.

According to one embodiment, the system 30 may include multiple cutting heads 32. A number of the cutting heads 32 may form respective AWJs via dry abrasive 46. One of the cutting heads 32 may be operable to form a respective AWJ via recycled abrasive (e.g., wet abrasive 44) collected from a remainder of the cutting heads 32 of the system 30.

According to one embodiment, the ratio of the system 30 may be adjustable to match the efficiency of the recycling process. For example, if the system 30 recaptures 50 percent of the spent abrasive, the ratio may be adjusted to match (i.e., 50 percent of the wet abrasive 44 and 50 percent of the dry abrasive 46). The method may include calculating the efficiency of the recycling process, and setting the ratio of the wet abrasive 44 to the dry abrasive 46 to match the calculated efficiency. An advantage of the system 30 being operated with the ratio matching the calculated efficiency is a reduction in storage capacity for the wet abrasive 44. However, the system 30 may be operated at ratios either above or below the calculated efficiency, or may be operated without calculating the recycling efficiency. If operated at a ratio below the calculated efficiency, adequate storage for excess of the wet abrasive 44 may be included as part of the system 30. If operated at a ratio above the calculated efficiency, additional/supplemental wet abrasive 44 may be added (e.g., from the storage or from an external source). If there is no immediate demand for recycled abrasive, the system 30 may store the recycled abrasive for later use, and the recycled abrasive may be actively or passively dried while in storage.

The system 30 may include control software 56 that predicts cutting speeds that compensate for additional water in the wet abrasive. The system 30 may include one or more sensors 58 that detect a status of one or more features of the system 30 (e.g., levels/amount of recycled abrasive, percent efficiency of recycled abrasive, additional water mixed with the wet abrasive, etc.). The system 30 is not limited to the locations of the sensors 58 as shown in the illustrated embodiment. Other components (e.g., involved with the feeding, metering, etc. of the dry abrasive 46) may also include sensors 58. According to one aspect of the disclosure, the control software 56 may automatically demand the use of recycled abrasive and the proper ratio of the wet abrasive 44 to the dry abrasive 46.

The control software 56 may include data identifying target cut speeds for various cutting operations (e.g., for given workpieces, operating pressures, type of abrasive, etc.) based on 100 percent dry abrasive being used to form the AWJ. The control software 56 may calculate an adjustment of one or more operational parameters (e.g., fluid pressure that forms the AWJ, abrasive flow rate, etc.) of the system 30 to compensate for the additional water included in the wet abrasive 44. For example, if the additional water in the wet abrasive 44 will slow down a cut by 5 percent, the control software 56 may increase the flow rate of the wet abrasive 44, or the dry abrasive 46, or both the wet abrasive 44 and the dry abrasive 46 to compensate for and minimize or eliminate the reduction in cutting speed.

The control software 56 may adjust the position of the AWJ cutting head 32 relative to a workpiece 76 to compensate for variations in cutting power (e.g., due to additional water mixed with the wet abrasive 44). The adjustments to position and/or motion of the AWJ cutting head 32, the workpiece 76, or both relative to one another may be calculated prior to cutting, and/or made in real-time during the cutting based on input (e.g., from the sensors 58) and selection of the ratio of the wet abrasive 44 to the dry abrasive 46.

The system 30 (e.g., the control software 56) may track operation data (e.g., total abrasive usage, abrasive material (e.g., garnet), abrasive type (crushed, alluvial), amount of abrasive recycled, number of recycling passes (i.e., how many times the abrasive has been used to process a workpiece as part of an AWJ and recycled and readied for re-use), type of material cut/processed, anticipated amount of kerf material). The system 30 (e.g. the control software 56, or a user) may modify a cutting model, which controls movement and operation of the AWJ cutting head 32 during a processing/cutting operation. The system 30 (e.g. the control software 56, or a user) may modify movement and operation of the AWJ 72 during a processing/cutting operation.

The system 30 (e.g., based on information provided by the sensors 58, or the tracked data) may determine when an influx of fresh abrasive is required, or may adjust the conditioner 40 to discard more or less abrasive as waste 80. The system 30 (e.g., the control software 56) may calculate and/or adjust the ratio of the wet abrasive 44 to the dry abrasive 46 as a function of the cut geometry. For example, some sections of a workpiece may be processed/cut at sub-optimum speeds due to machine or process limitations. Additionally, some finished part requirements may allow processing at sub-optimum speeds.

When processing/cutting these sections, the system 30 may adjust the ratio to increase the amount of the wet abrasive 44 being used as the lower cutting speed that would normally result is irrelevant, because that slower cut speed is being dictated by the cut geometry. The system 30 may avoid/ignore adjustments that include use of an increased amount of the wet abrasive 44 if no wet abrasive 44 is present and ready for use (e.g., which may be indicated by one of the sensors 58).

The method may include adjusting operating parameters of the system 30 in real-time (i.e., during a processing/cutting operation). For example, the system 30 may read and record data points indicating how much abrasive is used by the AWJ 72 (fresh abrasive, recycled abrasive, or both), how much "sludge" is extracted from the catcher tank 36, how much abrasive is reclaimed from the sludge. These data points may supply valuable information that the system 30 may use in combination with the control software's 56 knowledge of the cutting application. These adjustments may enable the system 30 to optimize a processing/cutting operation using multiple factors.

In addition to modifying cutting speeds as noted earlier, the amount/rate of abrasive being recycled could be adjusted in real-time. As an example, a cutting process may include a finer surface finish (e.g., relative to another cutting process). The system 30 may adjust the conditioner 40 (e.g., the sizer) to recover smaller abrasive particles (e.g., by decreasing the certain size), thereby enabling the recovery/reuse of smaller abrasive particles. Feeding smaller abrasive particles into the AWJ cutting head 32 to form the AWJ may achieve the finer surface finish when the AWJ (with the smaller abrasive particles) processes/cuts the workpiece (compared to fresh, larger abrasive particles).

Similarly, the system 30 may adjust the conditioner 40 (e.g., by decreasing the certain size) to accept and recycle smaller abrasive particles when upcoming sections of a processing/cutting operation may be performed at slower speeds. These types of optimizations may increase the yield of recycled abrasive that is collected and reintroduced into the AWJ cutting head 32.

Monitoring the flow of abrasive throughout the system 30 has the added advantage of giving a true picture of abrasive costs associated with operation of the system 30. This may give valuable insights when working with different brands and types of abrasive that fracture differently. The efficiency and cost impacts of operating parameters, such as water pressure on abrasive reuse, may be obtained. Thus the control software 56 may recommend strategic operational parameters for a given cutting application and economic target. For example, the system 30 may recommend a 100 hp 60,000 psi pump instead of a 100 hp 87,000 psi pump, based on a prediction/calculation that the selected abrasive may fracture less and have a longer operational life.

Still referring to FIGS. 3 to 5, a method of operating an abrasive fluid jet system (e.g., the system 30) may separately meter the wet abrasive 44 and the dry abrasive 46. The method may include combining the wet abrasive 44 and the dry abrasive 46 (e.g., after they have each been separately metered). According to one embodiment, the combining may take place outside of the AWJ cutting head 32. According to another embodiment, the combining may take place inside the AWJ cutting head 32 (e.g., within a mixing chamber 60 of the AWJ cutting head 32). As shown, the AWJ cutting head 32 may include a first abrasive inlet port 62, through which the wet abrasive 44 enters the mixing chamber 60, and a second abrasive inlet port 64, through which the dry abrasive 46 enters the mixing chamber 60.

The method may include a flow of the dry abrasive 46 to the AWJ cutting head 32 at a first flow rate. The method may further include supplying a flow of the wet abrasive 44 to the AWJ cutting head 32 at a second flow rate simultaneously while supplying the flow of the dry abrasive 46 to the AWJ cutting head 32. The method may further include mixing the wet abrasive 44 and the dry abrasive 46 to form the combined abrasive 48.

The system 30 may include an intersection 49 where a path of the wet abrasive 44 toward the AWJ cutting head 32 and a path of the dry abrasive 46 toward the AWJ cutting head 32 converge. The intersection 49 may be upstream of the combined wet and dry abrasive meter 50 (as shown in FIG. 3), downstream of both the wet abrasive meter 52 and the dry abrasive meter 54 (as shown in FIG. 4), or within the AWJ cutting head 32 (e.g., within the mixing chamber 60 as shown in FIG. 5).

As shown, the system 30 may include a wet abrasive feed hopper 66 that contains and supplies the flow of the wet abrasive 44 through the first abrasive inlet port 62, and a dry abrasive feed hopper 68 that contains and supplies the flow of the dry abrasive 46 through the second abrasive inlet port 64, which may be separate from the first abrasive inlet port 62 as shown. According to another embodiment, the wet abrasive 44 and the dry abrasive 46 may be mixed prior to entering the mixing chamber 60, and the combined abrasive 48 may be delivered through a single port (e.g., the first abrasive inlet port 62).

The method may include adding both the wet abrasive 44 and the dry abrasive 46 to a fluid jet 70 generated by the AWJ cutting head 32 to form an AWJ 72. The method may include discharging the AWJ 72 from an outlet 74 of the AWJ cutting head 32. The method may include processing one or more workpieces 76 with the AWJ 72. After processing the workpiece 76, the AWJ 72, including the now spent abrasive 78, may dissipate in the catcher tank 36.

The method may include extracting the spent abrasive 78 from the catcher tank 36 and conditioning the extracted, spent abrasive 78. Conditioning the extracted, spent abrasive 78 may include filtering, cleaning, classifying, or any combination thereof. The conditioning may be completed by the conditioner 40. The conditioner 40 may separate and/or dispose of waste 80, while routing the wet abrasive 44 that is suitable for recycled use to the wet abrasive feed hopper 66.

The system 30 may include one or more controllers 81 that adjust operational parameters (e.g., flow rates of the abrasive(s), flow rate of water, the ratio, vibration of one or more components, actuation of valves, pressure of vessels, etc.). The one or more controllers 81 may be communicatively coupled to the control software 56 such that the adjustment of the operational parameters by the control software 56 is enabled. The adjustment of the operation parameters by the control software 56 may be based on data provided by the one or more sensors 58. The system 30 is not limited to the number or arrangement of the sensors 58 and the controllers 81 as shown. Any of the components of the system 30 may include sensors 58, controllers 81, or both to monitor, collect data, and adjust operational parameters of the respective component(s).

Figure 6:
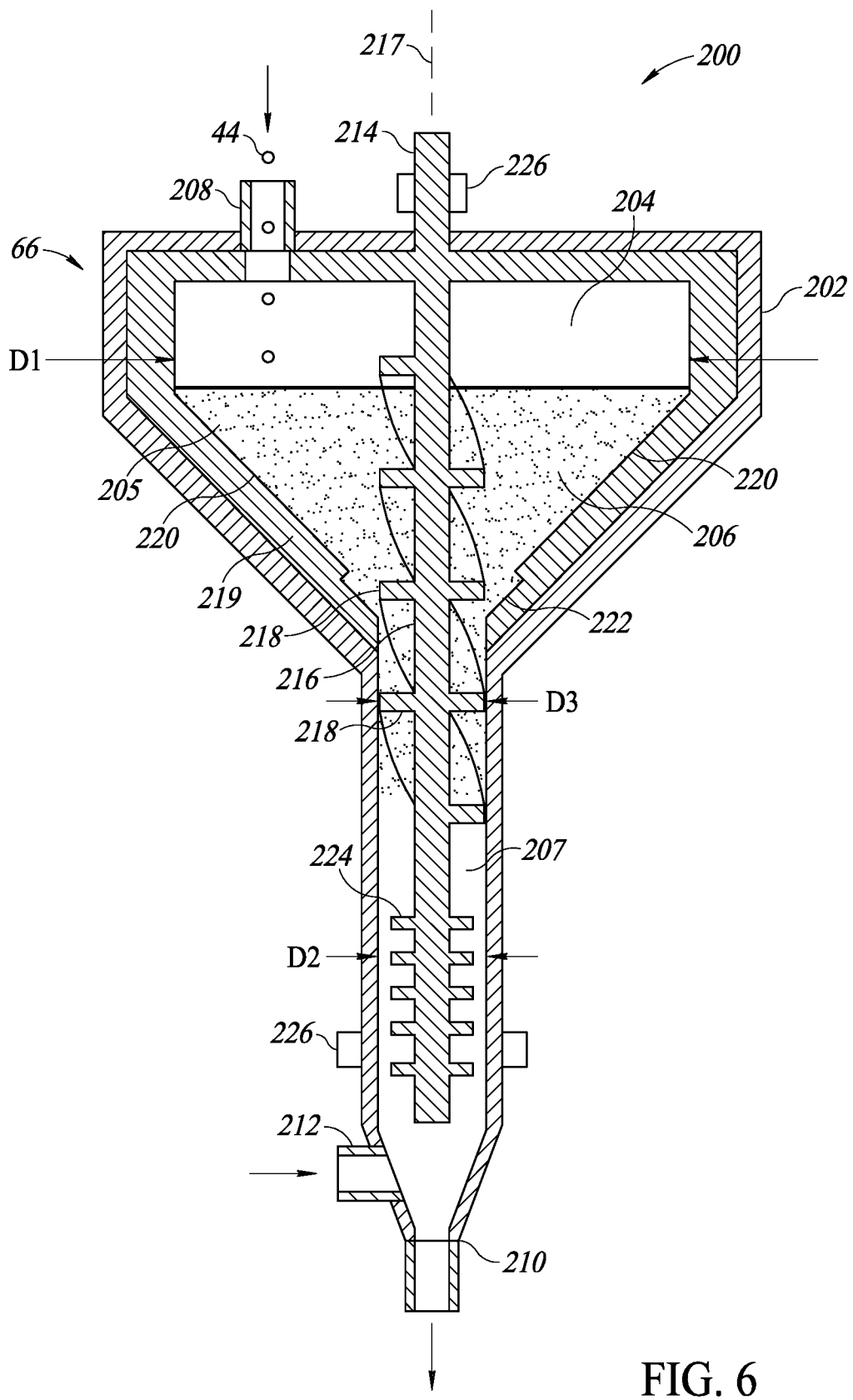
FIG. 6 is a side, cross-sectional view of a wet abrasive metering device, according to one embodiment.
Figure 7:
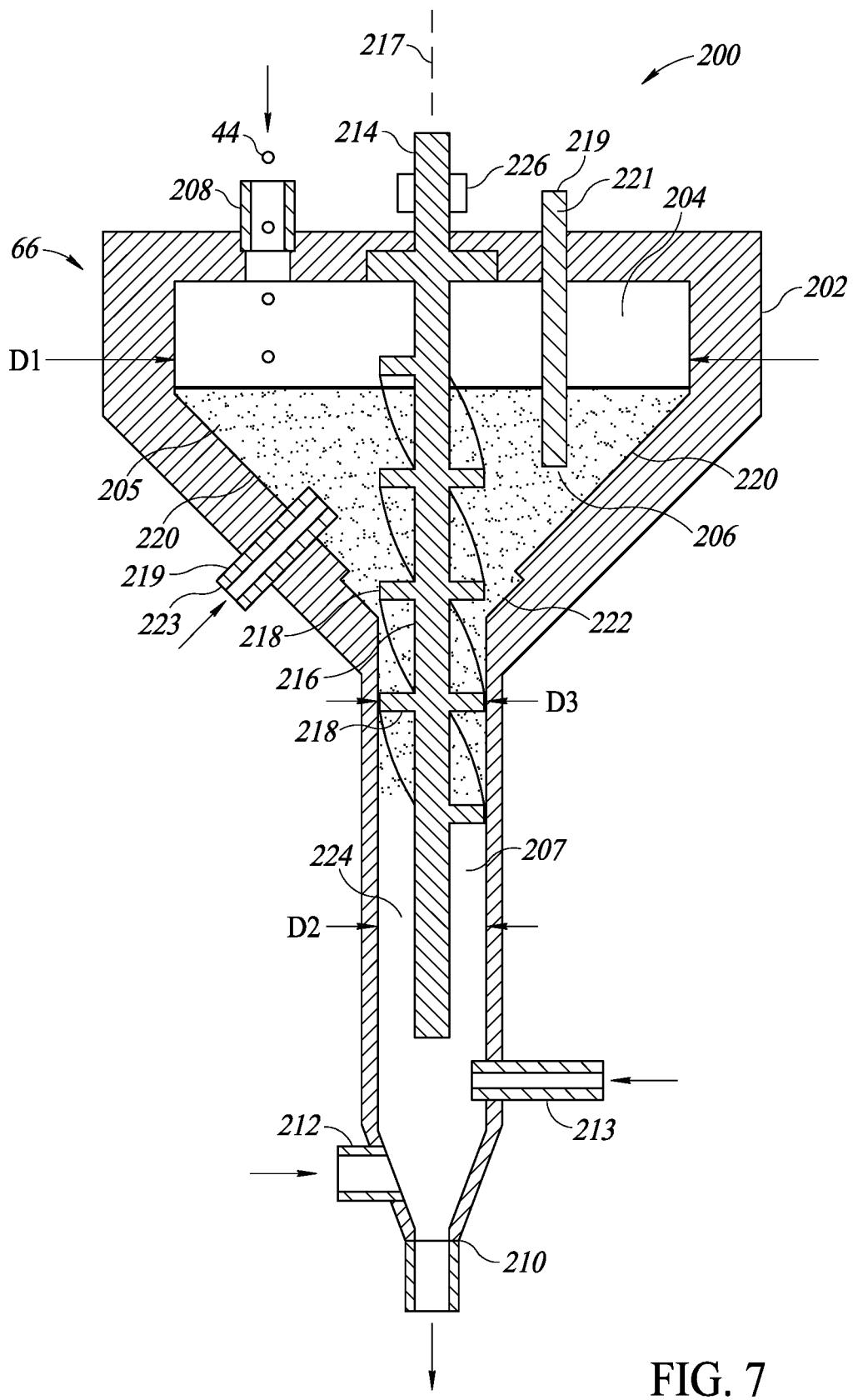
FIG. 7 is a side, cross-sectional view of a wet abrasive metering device, according to one embodiment.

Referring to FIGS. 5 to 7, the wet abrasive feed hopper 66 may include components that facilitate the feeding and metering of the wet abrasive 44 (e.g., abrasive in a non-free-flowing paste or non-free-flowing nearly dry phase). As shown, the wet abrasive feed hopper 66 may include a metering device 200 that meters wet abrasive and advances the wet abrasive towards an AWJ cutting head.

According to one aspect of the disclosure, the metering device 200 may be part of the system 30 and the wet abrasive 44 may be fed to the metering device 200 from the conditioner 40. As discussed above, abrasive in a non-free-flowing phase may not consistently flow by gravity alone through an orifice (especially smaller orifices) at the outlet of a container that holds the abrasive. Thus, the metering device 200 may include components that assist the flow of abrasives in a non-free-flowing phase.

As shown, the metering device 200 may include a vessel 202 that at least partially encloses an interior volume 204. The interior volume 204 may include a first portion 205 and a second portion 207. The first portion 205 may have a first cross-sectional dimension D1, and the second portion 207 may have a second cross-sectional dimension D2 that is less than D1. The first cross-sectional dimension D1 may be tapered along a length of the vessel 202 (e.g., such that the first cross-sectional dimension D1 decreases as the first portion 205 approaches the second portion 207. The second cross-sectional dimension D2 may be constant along a portion of the length of the vessel 202.

The interior volume 204 may contain the abrasive 206 (e.g., the wet abrasive 44). The vessel 202 may include a number of openings that provide passage into the interior volume 204. As shown, the vessel 202 may include an abrasive inlet 208, through which the abrasive 206 in a non-free-flowing phase may enter (e.g., continuously) into the interior volume 204. According to another embodiment, a portion of the vessel 202 (e.g., a top or lid) may be movable relative to a remainder of the vessel 202 allowing a batch of the abrasive 206 in a non-free-flowing phase to enter (e.g., intermittently) into the interior volume 204.

The abrasive 206 may be conveyed to the interior volume 204 via mechanical conveyor (e.g., auger, conveyor belt), which may optionally be aided by vibration. According to one embodiment, the abrasive 206 may be conveyed to the interior volume 204 via pneumatic conveyor.

Part of the first portion 205 (e.g., proximate the abrasive inlet 208) may have a constant first cross-sectional dimension D1 along the length of the vessel 202. The vessel 202 may include an abrasive outlet 210 through which the abrasive 206 exits the interior volume 204 and the metering device 200. Tubing, conduit, or some other transport passage may be coupled to the abrasive outlet 210 to carry the abrasive 206 toward a cutting head (e.g., the AWJ cutting head 32 of the system 30).

The vessel 202 may include one or more air inlet ports 212. As shown, the air inlet port 212 may be positioned closer to the abrasive outlet 210 than the air inlet port 212 is from the abrasive inlet 208. The air inlet port 212 may be positioned so as to deliver air to the interior volume 204 (e.g., proximate the abrasive outlet 210) that carries the abrasive 206 through the abrasive outlet 210 and towards a cutting head. The one or more air inlet ports 212 may be in the form of an air jet that delivers a high velocity stream of air to break up any clumps or clusters of abrasive that are exiting the interior volume 204. According to one embodiment, the vessel 202 may include an air jet 213 proximate the air inlet port 212, and positioned to deliver a jet of air that breaks up clumps of abrasive prior to exiting the interior volume 204. According to one embodiment, the air jet 213 may provide between about 0.1 to about 1.5 cubic feet of air per minute. Other embodiments, include values for the volume of air delivered by the air jet 213 above or below this range.

The metering device 200 may include one or more components that move the abrasive within interior volume 204. As shown, the metering device 200 may include a shaft 214 that is rotatable (e.g., spun by a motor) relative to the vessel 202. The shaft 214 may be rotatable about an axis 217 (e.g. a central axis of the shaft 214). The shaft 214 may include an auger 216. According to one embodiment, rotation of the auger 216 transports portions of the abrasive 206 that are positioned between adjacent flights 218 of the auger 216. The auger 216 may include a spiral blade (e.g., tapered or constant diameter) such that the adjacent flights 218 refer to portions of the auger 216 that are aligned along a direction parallel to the axis 217. The shape of the flights 218 and the direction of rotation of the auger 216 moves the portions of the abrasive 206 toward the abrasive outlet 210 (e.g., "down" as shown in the illustrated embodiment).

The auger 216 (e.g., the flights 218) may have a third cross-sectional dimension D3 that corresponds to the second cross-sectional dimension D2. The third cross-sectional dimension D3 and the second cross-sectional dimension D2 may correspond such that the auger is rotatable within the second portion without the flights touching the vessel 202, while restricting or preventing wet abrasive from flowing between a gap between the flights 218 and the vessel 202. Such flow may result in less accurate metering of the flow rate of the wet abrasive 206. Thus, the rotation rate of the auger 216 may correlate to the flow rate. According to one embodiment, the flow rate of the abrasive 206 may be increased (by rotating the auger 216 faster) or decreased (by rotating the auger 216 more slowly).

The metering device 200 may include one or more mixers 219 that move the abrasive 206 within the interior volume 204. As shown, the one or more mixers 219 may include: one or more stirring rods 220 that move through the interior volume 204 and thereby move particles of the abrasive 206; one or more vibrating members 221 (e.g., rods) positioned at least partially within the interior volume 204 that vibrate relative to the vessel 202; one or more gas jets 223 (e.g., air jets) positioned so as to supply a stream of gas into the interior volume 204 of the vessel 202; or any combination thereof. The metering device 200 may include one type of the one or more mixers 219 (as shown in FIG. 6), or a combination of the one or more mixers 219 (as shown in FIG. 7).

According to one embodiment, the stirring rods 220 may be rotatable (e.g., about the axis 217). As shown the shaft 214 and stirring rods 220 may be rotationally coupled to one another such that rotation of the shaft 214 simultaneously rotates both the auger 216 and the stirring rods 220. Alternatively, the stirring rods 220 may be movable independently of the shaft 214 and/or the auger 216 (e.g. so as to enable the stirring rods 220 to move/mix the abrasive 206 within the interior volume 204 even if the auger 216 is not moving, which may occur when the flow rate for the metering device 200 is set to zero). According to one embodiment, the stirring rods 220 may be rotatable in a direction opposite to the direction of rotation of the shaft 214.

The mixers 219 may be integral with an inner surface of the metering device 200 that delineates the interior volume 204. As shown, the stirring rods 220 may include raised protrusions on a peripheral, radial surface 222. The mixers 219 may include components that are remote from any interior surfaces of the metering device (e.g., the mixers 219 may be translatable radially, vertically, etc.). Movement of the mixers 219 agitates the abrasive 206 and may break up clumps thereby improving flow of the abrasive 206 into the spaces between adjacent flights 218 of the auger 216.

The metering device 200 may include at least one dispersion rod 224 (e.g., positioned downstream of the flights 218 of the auger 216). According to one embodiment, the dispersion rods 224 may be in the form of spokes extending (e.g., radially) from the shaft 214. According to one embodiment, the dispersion rods 224 may be in the form of rings or discs (e.g., arranged vertically and spaced from adjacent ones of the dispersion rods 224, as shown in the illustrated embodiment). The dispersion rods 224 may be positioned so as to strike and scatter clumps of the abrasive 206 that are ejected from the auger 216 prior to passing through the abrasive outlet 210. The dispersion rods 224 may be supported by the shaft 214 (as shown), the vessel 202, or both.

According to one embodiment, the at least one dispersion rod 224 may be rotatable relative to the shaft 214. The at least one dispersion rod 224 may be rotated at a higher speed, relative to the shaft 214, to enable the dispersion rods 224 to impact and break up any clumps of abrasive. As shown in FIG. 7, the metering device 200 may be devoid of any dispersion rods 224.

The metering device 200 may include one or more vibrators 226 that vibrate or shake one or more components (e.g., the shaft 214, the auger 216, the stirring rods 220, the peripheral, radial surface 222, the dispersion rods 224, or any combination thereof) of the metering device 200. According to an embodiment, one of the vibrators 226 may be coupled to the shaft 214 so as to apply vibration to the shaft 214, the auger 216, the stirring rods 220, the peripheral, radial surface 222, the dispersion rods 224, or any combination thereof. According to an embodiment, one of the vibrators 226 may be coupled to the vessel 202 (e.g., a stationary portion of the vessel 202 relative to the rotatable shaft 214).

According to one embodiment, the metering device 200 may be devoid of any of the vibrators 226 (as shown in FIG. 7). The metering device 200 may include one or more of the air jets 213 instead of or in addition to the vibrator 226.

Figure 8:
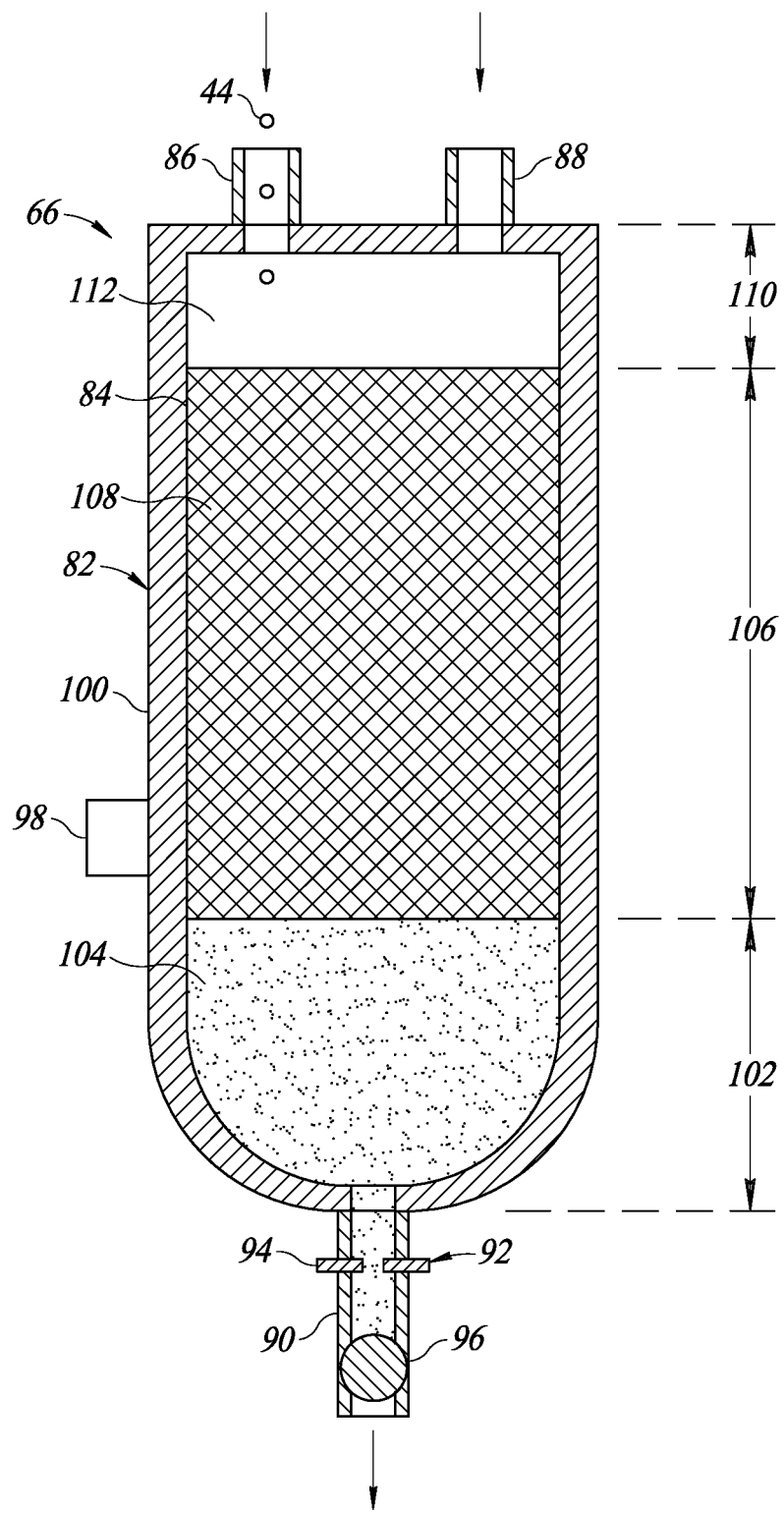
FIG. 8 is a side, cross-sectional view of a wet abrasive metering device, according to one embodiment.

Referring to FIGS. 5 and 8, the wet abrasive feed hopper 66 may include components that facilitate the feeding and metering of the wet abrasive 44 (e.g., in a free-flowing slurry phase). As shown, the wet abrasive feed hopper 66 may include a vessel 82 that encloses an interior volume 84. The vessel 82 may include a wet abrasive inlet 86 through which the wet abrasive 44 is fed into the interior volume 84. According to one aspect of the disclosure, the wet abrasive feed hopper 66 may be part of the system 30 and the wet abrasive 44 may be fed to the wet abrasive feed hopper 66 from the conditioner 40.

The wet abrasive feed hopper 66 may include an inlet 88 through which a gas (e.g., air) or a liquid (e.g., water) may enter the interior volume 84 to pressurize the interior volume 84. According to one embodiment, the inlet 88 may function as a vacuum source through which a vacuum may be applied to the interior volume 84 to pressurize the wet abrasive hopper 66. The wet abrasive feed hopper 66 may include a wet abrasive outlet 90 through which the wet abrasive 44 exits the interior volume 84. According to one aspect of the disclosure, the wet abrasive feed hopper 66 may be part of the system 30 and the wet abrasive 44 may be fed to the AWJ cutting head 32 after exiting the wet abrasive feed hopper 66 from the wet abrasive outlet 90.

The wet abrasive feed hopper 66 may include a meter 92 that controls and/or measures a flow of the wet abrasive 44 that exits the wet abrasive feed hopper 66. The meter 92 may be an orifice meter that includes one or more orifice plates 94 with various sizes that enable the flow rate of the wet abrasive 44 exiting the wet abrasive feed hopper 66 to be adjusted. Although shown within the wet abrasive outlet 90 in the illustrated embodiment, the meter 92 may be located elsewhere (e.g., farther downstream and closer to the AWJ cutting head 32) or even remote from the wet abrasive feed hopper 66 (i.e., proximate to or part of the AWJ cutting head 32).

The wet abrasive feed hopper 66 may include one or more valves 96 to control (e.g., allow, increase, decrease, stop) flow into and out of the interior volume 84. The wet abrasive inlet 86, the inlet 88, the wet abrasive outlet 90, or any combination thereof may each include one or more of the valves 96. For example, the wet abrasive outlet 90 may include one of the valves 96 that controls outflow of the wet abrasive 44 out of the interior volume 84. The valve 96 may be positioned downstream of the meter 92 (as shown), may be positioned upstream of the meter 92, or multiple ones of the valves 96 may be positioned both upstream and downstream of the meter 92.

The wet abrasive feed hopper 66 may include a source of vibration (e.g., a vibrator 98) coupled to (e.g., carried by) the vessel 82 such that the vibrator 98 vibrates the vessel 82, the wet abrasive 44 inside the interior volume 84, or both. The vibrator 98 may be mounted on/fastened to an outer surface 100 of the vessel 82, as shown in the illustrated embodiment. According to one embodiment, the vibrator 98 may be positioned within the interior volume 84. Vibration of the vessel 82 and/or the wet abrasive 44 within the interior volume 84 maintains consistency of the free-flowing slurry phase of the wet abrasive 44 and enhances dynamics of the flow of the wet abrasive 44 through the wet abrasive outlet 90. This may result in a more constant and consistent flow of the wet abrasive 44.

A method of use of the wet abrasive feed hopper 66 (e.g., part of the method of recycling wet abrasive or the method of operating an AWJ) may include occupying a first portion 102 of the interior volume 84 with wet abrasive particles 104 that have all of their interstitial gaps filled with fluid (e.g., water). As shown in the illustrated embodiment, the first portion 102 may include the portion of the interior volume 84 closest to the wet abrasive outlet 90 (e.g., the bottom or lowest portion of the interior volume 84). The method may include occupying a second portion 106 of the interior volume 84 with the same type of fluid (e.g., water 108) that is filling the interstitial gaps in the first portion 102. As shown in the illustrated embodiment, the second portion 106 may include the portion of the interior volume 84 adjacent to (e.g., just above) the first portion 102. According to one embodiment, the second portion 106 may occupy the remainder of the interior volume 84, such that the first portion 102 and the second portion 106 collectively occupy the entirety of the interior volume 84.

According to one embodiment, the method may include pressurizing the interior volume 84 (e.g., by occupying a third portion 110 of the interior volume 84 with a pressure medium (e.g., a gas, such as air 112, or a liquid such as water) supplied via the inlet 88. The vessel 82 may be pressurized (e.g., via the addition of the air 112 through the inlet 88), for example up to 10 psi. The pressure within the interior volume 84 may be varied (e.g., over 10 psi) and set high enough to result in smooth flow of the wet abrasive particles 104.

The method may include adjusting the flow rate of the wet abrasive 44 from the vessel 82. Adjusting the flow rate may include changing an orifice diameter of the orifice plate 94, changing a cross-sectional dimension (e.g., diameter) of the wet abrasive outlet 90, increasing the pressure within the vessel 82, switching the type of abrasive material, or any combination thereof.

The wet abrasive feed hopper 66 may include the interior volume 84 having a layer of the wet abrasive particles 104 having all of their interstitial gaps filled with water, a layer of the water 108, and a layer of air 112. As shown, the layer of the air 112 may be above the layer of the water 108, and the layer of the water 108 may be above the layer of the wet abrasive particles 104.

Figure 9:
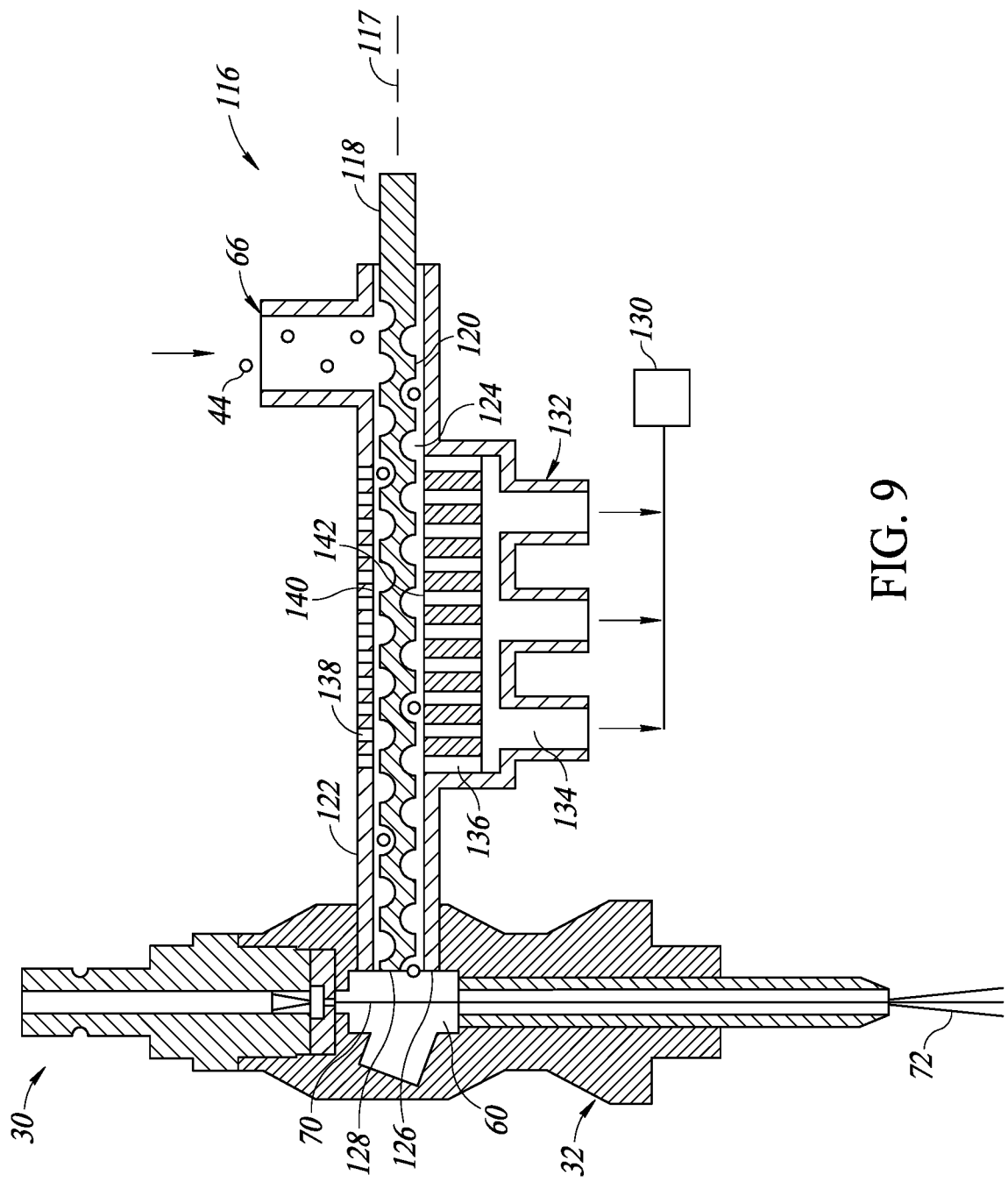
FIG. 9 is a side, cross-sectional view of a wet abrasive metering device, according to one embodiment.

Referring to FIG. 9, the system 30 (e.g., the wet abrasive feed hopper 66) may include a dewatering device 116 (i.e., a dewaterer). The dewatering device 116 may include components that facilitate the feeding and metering of the wet abrasive 44 (e.g., in a free-flowing slurry phase). As shown, the dewatering device 116 may include an auger 118 that is rotatable about an axis 117 (e.g. a central axis of the auger 118). According to one embodiment, rotation of the auger 118 transports portions of the wet abrasive 44 that are positioned between adjacent flights 120 of the auger 118. The shape of the flights 120 and the direction of rotation of the auger 118 moves the portions of the wet abrasive 44 toward the AWJ cutting head 32 (e.g., laterally, or along a direction non-perpendicular to the direction of the force of gravity) as shown in the illustrated embodiment.

The dewatering device 116 may include a conduit 122 that encloses the auger 118 within a lumen 124 of the conduit 122. The conduit 122 may provide passage toward the AWJ cutting head 32. As shown, the conduit 122 may include a terminal end 126 that is positioned directly adjacent to the mixing chamber 60 of the AWJ cutting head 32. Thus, according to one embodiment, rotation of the auger 118 transports the wet abrasive 44 along a length of the conduit 122, and towards an exit 128 of the lumen 124 that is formed by the terminal end 126. As the wet abrasive 44 passes through the exit 128, the wet abrasive 44 enters a chamber (e.g., the mixing chamber 60) through which a fluid jet (e.g., the fluid jet 70) passes. As the wet abrasive 44 exits the dewatering device 116, the wet abrasive 44 may be entrained into the fluid jet 70 thereby forming the AWJ 72. Thus, the system 30 may be devoid of any intermediate transport (e.g., conduits, pipes, etc.) between the exit 128 and the mixing chamber 60.

The dewatering device 116 may include and/or be attached to a pressurizer (e.g., a source of vacuum and/or suction, such as a vacuum 130). Alternatively, or in addition to the vacuum 130, the pressurizer may include a positive pressure source that delivers positive pressure to the lumen 124. The dewatering device 116 may include one or more ports 132 that are fluidly coupled to the vacuum 130 and the lumen 124. The one or more ports 132 may include a first set of ports 134 that are larger in size (e.g., diameter) and close to the vacuum 130, and a second set of ports 136 that are smaller in size (e.g., diameter) compared to the first set of ports. The second set of ports 136 may be more numerous than the first set of ports 134 and/or positioned closer to the lumen 124 than the second set of ports 136.

The dewatering device 116 may include one or more vents 138 that provide passage for air and/or liquid (e.g., water) through the conduit 122 and into the lumen 124. The one or more vents 138 may be positioned to assist in operation of the vacuum 130 (e.g., opposite the one or more vents 138 across the length (i.e., direction of flow of the wet abrasive 44 within the conduit) of the conduit 122. As shown, the vacuum/suction may be applied to the lumen 124 in a second direction. The second direction may be angularly offset (e.g., perpendicular) to the first direction. According to one embodiment, the second direction is parallel to the direction of the force of gravity (i.e., "down") as shown in the illustrated embodiment.

According to one aspect of the disclosure, a method of use of the wet abrasive feed hopper 66 (e.g., part of the method of recycling wet abrasive or the method of operating an AWJ) may include delivering the wet abrasive 44 (e.g., in the free-flowing slurry phase) to the dewatering device 116. The wet abrasive 44 enters the lumen 124 of the conduit 122, and is advanced along a first direction toward the mixing chamber 60 of the AWJ cutting head 32. According to one embodiment, the first direction is angularly offset (e.g., perpendicular to) the direction of the force of gravity (or the ground). The method may include advancing the wet abrasive 44 along the first direction and removing excess water from the wet abrasive 44 along the second direction.

Advancing the wet abrasive 44 may include rotating the auger 118 about the axis 117, thereby capturing portions of the wet abrasive 44 between adjacent ones of the flights 120 and advancing the captured portions of the wet abrasive in the first direction. The method may include providing suction through the one or more ports 132 to the lumen 124, thereby removing excess water from the wet abrasive 44. Air may enter the lumen 124 through the vents 138 as the excess water is removed from the wet abrasive 44 through the ports 132 due to suction applied via the vacuum 130.

The dewatering device 116 may include one or more interfaces that permit passage of a first substance across the interface while preventing passage of a second substance across the interface. A first interface 140 may be between the vents 138 and the lumen 124. The first interface 140 may allow passage of air, and/or water across the first interface 140 (from an external environment surrounding the dewatering device 116 to the lumen 124) and may prevent passage of the wet abrasive 44 across the first interface 140. The first interface 140 may include a physical barrier (e.g., screen, filter, membrane, etc.) or may rely in whole or in part on gravity to prevent the wet abrasive 44 from crossing the first interface 140 (e.g., the vents 138 may open "up" to the external environment).

A second interface 142 may be between the one or more ports 132 (e.g., the second set of ports 136) and the lumen 124. The second interface 142 may allow passage of liquid (e.g., water) across the second interface 142 (from the lumen 124 out through the one or more ports 132) and may prevent passage of the particles of the wet abrasive 44 from crossing the second interface 142. The second interface 142 may include a physical barrier (e.g., screen, filter, membrane, etc.) that is water permeable but impermeable to the abrasive particles within the wet abrasive 44.

Passing by all of the one or more ports 132, and removing the excess water from the wet abrasive 44, may transition the wet abrasive 44 from the free-flowing slurry phase to the nearly dry phase. Thus, the dewatering device 116 may take advantage of the flowability of the wet abrasive 44 in the free-flowing slurry phase to transport the wet abrasive 44 into close proximity of the AWJ cutting head 32, and then remove the excess water just prior to the wet abrasive 44 entering the mixing chamber 60, thereby reducing the decrease in cutting power associated with the addition of excess water to the fluid jet 70.

According to one embodiment, the method may include advancing the wet abrasive 44 along the first direction (e.g., via rotation of the auger 118) toward the AWJ cutting head 32. The method may include, while advancing the wet abrasive 44 along the first direction, lowering the percent of weight of water within the wet abrasive 44. The amount of water removed from the wet abrasive 44 while advancing in the first direction via rotation of the auger 118 may be greater than 20 percent by weight. The amount of water removed from the wet abrasive 44 while advancing in the first direction via rotation of the auger 118 may be greater than 50 percent by weight. The amount of water removed from the wet abrasive 44 while advancing in the first direction via rotation of the auger 118 may be sufficient to transition the wet abrasive 44 from a first phase (e.g., the free-flowing slurry phase) to a second phase (e.g., the non-free-flowing nearly dry phase).

Lowering the percent of weight of water may be accomplished without applying heat (e.g., via a heater) to the conduit 122 and/or the wet abrasive 44. Alternatively, the dewatering device 116 may include a heater (not shown). The heater may be positioned proximate the conduit so as to apply heat to the wet abrasive 44 within the lumen 124 (e.g., between the one or more ports 132 and the mixing chamber 60). The method may include metering the amount and/or flow rate of the wet abrasive 44 being advanced toward the AWJ cutting head 32.

According to one embodiment, the lumen 124 may include wet abrasive 44 near an inlet 66 of the conduit with a first moisture content, wet abrasive 44 near the one or more ports 132 with a second moisture content, and wet abrasive near the mixing chamber 60 with a third moisture content. The first moisture content may be higher than the second moisture content, and the second moisture content may be higher than the third moisture content.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fluid jet cutting system comprising:
a first abrasive feed container including a first vessel that encloses a first interior volume, the first interior volume at least partially occupied by dry abrasive with a first moisture content;
a second abrasive feed container including a second vessel that encloses a second interior volume, the second interior volume at least partially occupied by wet abrasive with a second moisture content that is higher than the first moisture content;
a cutting head having:
an orifice unit through which fluid passes to generate a fluid jet;
a mixing chamber downstream of the orifice unit through which the fluid jet passes, the mixing chamber communicatively coupled to the first abrasive feed container such that the dry abrasive has a first path from the first abrasive feed container to the mixing chamber where the dry abrasive is added to the fluid jet to form an abrasive fluid jet, and the mixing chamber communicatively coupled to the second abrasive feed container such that the wet abrasive has a second path from the second abrasive feed container to the mixing chamber where the wet abrasive is added to the fluid jet to form the abrasive fluid jet; and
an outlet though which the abrasive fluid jet exits the cutting head.

2. The system of claim 1, further comprising:
a meter that measures a flow rate of the wet abrasive, the meter positioned downstream of the second interior volume and upstream of the mixing chamber with respect to the second path.

3. The system of claim 2, further comprising:
an intersection where the first path and the second path converge and where the dry abrasive mixes with the wet abrasive to form a combined abrasive,
wherein the meter is positioned downstream of the intersection and the meter measures a flow rate of the combined abrasive.

4. The system of claim 2 wherein the meter is a first meter, the system further comprising:
an intersection where the first path and the second path converge and where the dry abrasive mixes with the wet abrasive to form a combined abrasive; and
a second meter that measures a flow rate of the dry abrasive, the second meter positioned downstream of the first interior volume and upstream of the intersection with respect to the first path,
wherein the first meter is positioned downstream of the second interior volume and upstream of the intersection with respect to the second path.

5. The system of claim 3, further comprising:
a ratio of the wet abrasive to the dry abrasive that forms the combined abrasive; and
a controller that adjusts the ratio.

6. The system of claim 5, further comprising:
control software communicatively coupled to the controller such that the ratio is adjustable by the control software.

7. The system of claim 6, further comprising one or more sensors communicatively coupled to the control software, and the adjustment of the ratio is performed by the control software based on data provided by the one or more sensors.

8. The system of claim 7 wherein the data provided by the one or more sensors includes an amount of the wet abrasive occupying the second interior volume.

9. The system of claim 5 wherein the ratio is adjustable from 100 percent of the wet abrasive and 0 percent of the dry abrasive to 0 percent of the wet abrasive and 100 percent of the dry abrasive and any increment in between.

10. The system of claim 1 wherein the first moisture content is between 0% and 0.1%, and the second moisture content is between 0.1% and 90%.

11. The system of claim 1, further comprising:
a catcher tank containing a volume of fluid, the catcher tank positioned relative to the cutting head such that the abrasive fluid jet dissipates within the volume of fluid after exiting the outlet; and
an abrasive conditioner that receives abrasive removed from the catcher tank, the abrasive conditioner communicatively coupled to the second abrasive feed container, wherein the abrasive conditioner conditions the received abrasive prior to transfer of the received abrasive to the second abrasive feed container.

12. A method of operating an abrasive fluid jet cutting system, the method comprising:
feeding dry abrasive from a first abrasive feed container into a mixing chamber of an abrasive fluid jet cutting head, wherein the dry abrasive has a first moisture content when in the first abrasive feed container;
feeding wet abrasive from a second abrasive feed container into the mixing chamber, wherein the wet abrasive has a second moisture content when in the second abrasive feed container, and the second moisture content is greater than the first moisture content;
generating a fluid jet within the abrasive fluid jet cutting head such that the fluid jet passes through the mixing chamber; and
entraining both the dry abrasive and the wet abrasive that has been fed into the mixing chamber into the fluid jet thereby forming an abrasive fluid jet.

13. The method of claim 12, further comprising:
metering a flow rate of the wet abrasive at a location upstream of the mixing chamber.

14. The method of claim 13, further comprising:
changing a ratio of the wet abrasive that enters the mixing chamber to the dry abrasive that enters the mixing chamber.

15. The method of claim 13, further comprising:
mixing the wet abrasive and the dry abrasive to form a combined abrasive at a location that is downstream of both the first abrasive feed container and the second abrasive feed container and upstream of the mixing chamber.

16. The method of claim 15, further comprising:
metering a flow rate of the dry abrasive at a location upstream of the intersection,
wherein metering the flow rate of the wet abrasive occurs at a location upstream of the intersection.

17. The method of claim 15, further comprising:
metering the combined abrasive at a location downstream of the intersection.

18. The method of claim 12, further comprising:
determining an amount of water within the wet abrasive; and
predicting a cut speed for the abrasive fluid jet to cut a workpiece,
wherein the predicted cut speed is a function of the amount of water within the wet abrasive.

19. The method of claim 18, further comprising:
identifying a change in the amount of water within the wet abrasive; and
predicting an updated cut speed for the abrasive fluid jet to cut the workpiece,
wherein the updated cut speed changes based at least in part on the identified change in the amount of water within the wet abrasive.

20. The method of claim 12, further comprising:
predicting a cut speed for a process in which the abrasive fluid jet cuts a workpiece, wherein a first portion of the process includes a predicted cutting speed that is higher than a predicted cutting speed for a second portion of the process;
cutting the workpiece with the abrasive fluid jet using the predicted cutting speeds for the first portion of the process and the second portion of the process; and
while cutting the workpiece, changing the ratio when transitioning from the first portion of the process to the second portion of the process.

21. The method of claim 20 wherein changing the ratio when transitioning from the first portion of the process to the second portion of the process includes increasing the ratio such that more of the wet abrasive enters the mixing chamber relative to the dry abrasive that enters the mixing chamber.

22. The method of claim 12, further comprising:
dissipating the abrasive fluid jet within a volume of fluid contained within a catcher tank, thereby depositing spent abrasive from the abrasive fluid jet in the volume of fluid;
extracting the spent abrasive from the volume of fluid;
separating particles of the spent abrasive that are below a certain size from a remainder of the spent abrasive; and
transporting the remainder of the spent abrasive to the second abrasive feed container.

* * * * *

UNITED STATES PATENT AND TRADEMARK OFFICE
CERTIFICATE OF CORRECTION

| | | |
|---|---|---|
| PATENT NO. | : 12,466,031 B2 | Page 1 of 1 |
| APPLICATION NO. | : 17/975407 | |
| DATED | : November 11, 2025 | |
| INVENTOR(S) | : Hopkins et al. | |

It is certified that error appears in the above-identified patent and that said Letters Patent is hereby corrected as shown below:

In the Specification

Column 5, Line 36:
"jet to form the abrasive fluid jet, and an outlet though which"
Should read:
--jet to form the abrasive fluid jet, and an outlet through which--

In the Claims

Column 23, Line 57, Claim 1:
"an outlet though which the abrasive fluid jet exits the"
Should read:
--an outlet through which the abrasive fluid jet exits the--

Signed and Sealed this
Tenth Day of February, 2026

John A. Squires
*Director of the United States Patent and Trademark Office*